(12) United States Patent
Burdett et al.

(10) Patent No.: US 12,189,769 B2
(45) Date of Patent: ***Jan. 7, 2025

(54) CLOUD STORAGE SCANNER

(71) Applicant: Sophos Limited, Abingdon (GB)

(72) Inventors: Mark Robert Burdett, Abingdon (GB); Guy Alexander Davies, Abingdon (GB)

(73) Assignee: Sophos Limited, Abingdon (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/699,286

(22) Filed: Mar. 21, 2022

(65) Prior Publication Data

US 2022/0207143 A1 Jun. 30, 2022

Related U.S. Application Data

(63) Continuation of application No. 15/635,279, filed on Jun. 28, 2017, now Pat. No. 11,281,775.

(30) Foreign Application Priority Data

Jun. 28, 2016 (GB) ..................... 1611202

(51) Int. Cl.
*H04L 29/06* (2006.01)
*G06F 16/182* (2019.01)
(Continued)

(52) U.S. Cl.
CPC .......... *G06F 21/565* (2013.01); *G06F 16/183* (2019.01); *G06F 21/567* (2013.01); *H04L 63/1425* (2013.01); *G06F 2221/034* (2013.01)

(58) Field of Classification Search
CPC .... G06F 21/565; G06F 21/567; G06F 16/183; G06F 2221/034; H04L 63/1425
See application file for complete search history.

(56) References Cited

U.S. PATENT DOCUMENTS 6,378,068 B1 * 4/2002 Foster .................. G06F 9/4812
 713/1
8,453,215 B1 * 5/2013 LeBert ................ G06F 16/2343
 726/4
(Continued)

FOREIGN PATENT DOCUMENTS

CN 103632094 3/2014

OTHER PUBLICATIONS

Shahid Alam et al., In-Cloud Malware Analysis and Detection: State of the Art, Sep. 2014, ACM, pp. 473-478. (Year: 2014 ).*

(Continued)

*Primary Examiner* — Kari L Schmidt
*Assistant Examiner* — Fahimeh Mohammadi
(74) *Attorney, Agent, or Firm* — Strategic Patents, P.C.

(57) ABSTRACT

A system, method and computer program for a scanning service is presented. A scanning service compatible with a cloud storage system is configured to receive notifications from a cloud storage service about storage event activity and to access data in the cloud storage service. The scanning service receives a notification regarding storage activity related to a file in the data. After the completion of the storage activity, the scanning service receives the file from the cloud storage service and scans the file. When a determination is made based on the scan that at least a portion of the file should not be distributed then an action is taken with respect to the cloud storage service based on the determination that at least a portion of the file should not be distributed.

20 Claims, 7 Drawing Sheets

(51) Int. Cl.
*G06F 21/56* (2013.01)
*H04L 9/40* (2022.01)

(56) References Cited

U.S. PATENT DOCUMENTS

| | | | |
|---|---|---|---|
| 8,726,405 | B1 | 5/2014 | Bailey et al. |
| 9,317,686 | B1* | 4/2016 | Ye .......................... G06F 21/568 |
| 9,686,308 | B1* | 6/2017 | Srivastava .............. H04L 12/14 |
| 10,635,641 | B1* | 4/2020 | Donze ..................... G06F 16/93 |
| 2006/0178997 | A1 | 8/2006 | Schneck et al. |
| 2006/0272021 | A1* | 11/2006 | Marinescu .............. G06F 21/56 726/24 |
| 2008/0066187 | A1* | 3/2008 | Dive-Reclus ....... G06F 21/6218 726/27 |
| 2009/0044024 | A1* | 2/2009 | Oberheide ............ H04L 63/145 713/188 |
| 2013/0246477 | A1 | 9/2013 | Faitelson et al. |
| 2013/0311597 | A1* | 11/2013 | Arrouye ................ G06F 9/5072 709/217 |
| 2014/0007239 | A1 | 1/2014 | Sharpe et al. |
| 2014/0019498 | A1* | 1/2014 | Cidon ................... G06F 16/182 707/827 |
| 2014/0101434 | A1* | 4/2014 | Senthurpandi ...... G06F 12/1408 713/150 |
| 2014/0149461 | A1* | 5/2014 | Wijayaratne ........ G06F 21/6236 707/783 |
| 2014/0259190 | A1* | 9/2014 | Kiang ..................... G06F 21/51 726/30 |
| 2015/0100357 | A1* | 4/2015 | Seese ................. G06Q 10/0631 705/7.12 |
| 2015/0331905 | A1 | 11/2015 | Brand |
| 2017/0048199 | A1* | 2/2017 | Hutton ................ H04L 63/0263 |
| 2017/0372070 | A1 | 12/2017 | Burdett et al. |
| 2018/0007069 | A1* | 1/2018 | Hunt ................... H04L 63/1408 |

OTHER PUBLICATIONS

Chris Jarabek et al., ThinAV: Truly Lightweight Mobile Cloud-based Anti-malware, Dec. 2012, ACM, pp. 209-218. (Year: 2012).*
Matthias Schmidt et al., Malware Detection and Kernel Rootkit Prevention in Cloud Computing Environments, Feb. 9-11, 2011, IEEE , pp. 603-610. (Year: 2011).*
Cristian Adrián Martínez et al., Malware Detection based on Cloud Computing integrating Intrusion Ontology representation, Sep. 15-17, 2010, IEEE, pp. 1-6. (Year: 2010).*
Alam, Shahid et al., "In-Cloud Malware Analysis and Detection: State of the Art", ACM Sep. 2014 , 6 pages.
Martinez, Cristian A. et al., "Malware Detection based on Cloud Computing integrating Intrusion Ontology representation", IEEE Sep. 2010 , 6 pages.
Schmidt, Matthias et al., "Malware Detection and Kernel Rootkit Prevention in Cloud Computing Environments", IEEE Feb. 2011 , 8 pages.
Jarabek, Chris et al., "ThinAV: Truly Lightweight Mobile Cloud-based Anti-malware", ACM Dec. 2012 , 10 pages.
"U.S. Appl. No. 15/635,279 Final Office Action mailed Jul. 7, 2021", 17 pages.
"U.S. Appl. No. 15/635,279 Final Office Action mailed Aug. 6, 2019", 18 pages.
"U.S. Appl. No. 15/635,279 Non-Final Office Action mailed Feb. 3, 2021", 18 pages.
"U.S. Appl. No. 15/635,279 Non-Final Office Action mailed Feb. 28, 2020", 18 pages.
"U.S. Appl. No. 15/635,279 Non-Final Office Action mailed Nov. 19, 2018", 20 pages.
"U.S. Appl. No. 15/635,279 Notice of Allowance mailed Nov. 18, 2021", 11 pages.
"U.S. Appl. No. 15/635,279 Final Office Action mailed Aug. 17, 2020", 18 pages.
IPO, "UK Application No. 1611202.1 Examination Report mailed Oct. 25, 2019", 3 pages.
IPO, "UK Application No. 1611202.1 Search and Examination Report mailed Dec. 14, 2016", 7 pages.

* cited by examiner

CLOUD STORAGE SCANNER

CROSS-REFERENCE TO RELATED APPLICATIONS

This application is a continuation of U.S. patent application Ser. No. 15/635,279 filed on Jun. 28, 2017, which claims priority to United Kingdom Pat. App. No. 1611202.1 filed on Jun. 28, 2016, where each of the foregoing is incorporated herein by reference in its entirety.

BACKGROUND

Malicious exploits, such as malware, may be used to compromise one or more target computing devices, cause damage to one or more computing devices or obtain private information from one or more computing devices. For example, malware may include computer viruses, Trojan horses, rootkits, key loggers, spyware, adware, viruses, worms, spam, phishing explorations, etc. Some exploits may use websites to host components of malicious code and download the components to a target computing device.

Some systems for the detection of malware in a computing device may employ signature-based detection. Such systems may also monitor the behavior or activity of applications on a computing device. However, such systems typically run on the protected computing device, with potentially some additional resources provided by other computing devices.

Cloud computing services have become increasingly popular. One example of cloud computing services is Amazon Web Services (AWS), which offers a suite of cloud computing services that provide an on-demand computing platform. AWS services span a wide range including compute, storage, networking, database, analytics, applications, deployment, management, developer tools, etc. One of the services, Amazon Simple Storage Service (S3), is a storage service. Cloud computing services provide computing capacity as an alternative to building an actual physical server farm.

SUMMARY

It is desired to provide protection against compromise (e.g., malware or other exploits) or confidential information exfiltration in cloud service environments in a manner that is simple and efficient, and with minimal performance impact on applications using the cloud computing services. It is desirable to accomplish this without use of an agent installed on the template image used in cloud-based environments. This may be accomplished in some implementations with an architecture that connects a scanning service directly to the cloud data storage associated with a target application, in a manner that is intended to be efficiently configured and managed.

Embodiments of the invention may provide an agentless scanner for a cloud storage service. The scanner is agentless in that it does not require, for example, an agent to reside on the host of the application that is using the cloud storage service. In some implementations, a scanning service for cloud storage receives notifications of storage activity from a storage monitor. For example, the scanning service may receive a notification of a file event or the file event itself, and scan the file for specific data content (e.g., potential or actual malicious content or content otherwise desired to be protected). If the scanning service returns a positive result (e.g., potential or actual malicious content or content otherwise desired to be protected), action may be taken. The action may include to quarantine the file by altering permissions on the file so that at least some other applications, such as the application that is using the cloud storage service, may not access it without administrator action. A user or administrator may be notified.

As one example, an implementation of an agentless scanning service configured for AWS infrastructure uses S3 buckets for file storage, registers with the S3 service to receive notifications of file activity, receives notifications of file activity, and scans files upon receiving the notifications. If the scan result is positive, action may be taken to protect the application, such as setting permissions to make the file unavailable, notifying an administrator, moving the file, renaming the file, encrypting the file, etc. The agentless scanning service simplifies workflow for deploying and managing data protection (e.g., anti-malware, data loss prevention) for applications making use of cloud resources. Applications that are fully implemented in the cloud and applications implemented elsewhere but that make use of cloud or remote storage resources may make use of an agentless scanning service.

In general, in one aspect, a system includes a processor and a non-transitory computer readable storage medium having computer readable code thereon. The medium includes instructions executable by the processor to perform operations including configure a scanning service to receive notifications from a cloud storage service about storage activity and to access data in the cloud storage service, and receive, by the scanning service from the cloud storage service, a notification regarding storage activity related to a file in the data. The medium also includes instructions to, after the completion of the storage activity, receive by the scanning service from the cloud storage service, the file. The medium also includes instructions to scan, by the scanning service, the file. The medium also includes instructions to determine from the scan that at least a portion of the file should not be distributed; and take an action, for example, with respect to the cloud storage service, based on the determination that at least a portion of the file should not be distributed.

In some implementations, the instructions are further executable by the processor to configure the scanning service to receive notifications from said cloud storage service about storage activity associated with a plurality of accounts associated with the cloud storage service. In some implementations, the instructions are further executable by the processor to take an action by setting a protection mode for the file on the cloud storage service. In some implementations, the instructions are further executable by the processor such that the protection mode is a Notify Only mode, and based on a determination that at least a portion of the file should not be distributed, a notification is sent a to a customer associated with the file.

In some implementations, when the protection mode is a Block File mode, upon on the determination that at least a portion of the file should not be distributed, a file permission is set to deny access to the file.

In some implementations, a determination that at least a portion of the file should not be distributed is based on the file containing malware, such as disruptive computer instructions that may cause one or more of damage to one or more computing devices, compromising files on one or more computer devices, obtaining private information from one or more computing devices.

In some implementations, a determination that at least a portion of the file should not be distributed is based on the file containing confidential information, the confidential information including one or more of credit card numbers, social security numbers, multiple phone numbers and a predefined pattern.

In general, in one aspect, a method includes configuring a scanning service to receive notifications from a cloud storage service about storage activity, and receiving, by the scanning service from the cloud storage service, a notification regarding storage activity related to a file. The method includes, after the completion of the storage activity, loading by the scanning service from the cloud storage service, the file. The method may include scanning the file by the scanning service; determining from the scan that at least a portion of the file should not be distributed; and taking an action with respect to the cloud storage service based on the determination that at least a portion of the file should not be distributed.

In some implementations, the method may include configuring the scanning service to receive notifications from the cloud storage service about storage activity associated with a plurality of accounts associated with the cloud storage service.

The method may include setting a protection mode for the file on the cloud storage service. The protection mode may be a notify only mode, for example, wherein files may not be blocked, but an administrator may be notified. The protection mode may be a block file mode, for example, wherein an action will be taken to present access or distribution of a file. The method may include, when the protection mode is a notify only mode, and based on the determination that at least a portion of the file should not be distributed, sending notification to an administrator or a user associated with the file. The method may include, when the protection mode is a block file mode, and based on a determination that at least a portion of the file should not be distributed, denying application access to the file, for example, by setting a file permission, changing a file name, moving a file, etc.

Determining that at least a portion of the file should not be distributed, based on a determination that the file contains malware, which may include one or more of a file capable of damage to one or more computing devices, compromising files on one or more computer devices, obtaining private information from the one or more computing devices. Determining that at least a portion of the file should not be distributed based on one or more of the file contains confidential information, the confidential information including one or more of credit card numbers, social security numbers, multiple phone numbers or predefined patterns.

In general, in an aspect, a non-transitory computer readable storage medium may have computer readable code thereon for a scanning service, the medium includes instructions executable by the processor to perform operations, including: configure a scanning service to receive notifications from a cloud storage service about storage activity and to access data in the cloud storage service; receive, by the scanning service from the cloud storage service, a notification regarding storage activity related to a file in the data; after the completion of the storage activity, receive by the scanning service from the cloud storage service, the file, scan, by the scanning service, the file, determine from the scan that at least a portion of the file should not be distributed, and take an action with respect to the cloud storage service based on the determination that at least a portion of the file should not be distributed.

The instructions may be further executable by the processor to configure the scanning service to receive notifications from said cloud storage service about storage activity associated with a plurality of accounts associated with the cloud storage service.

The instructions may be further executable by the processor to take an action by setting a protection mode for the file on the cloud storage service. The instructions may be further executable by the processor such that the protection mode is a Notify Only mode, based on the determination that at least a portion of the file should not be distributed, a notification is sent a to a customer associated with the file. The instructions may be further executable by the processor such that when said protection mode is a Block File mode, based on the determination that at least a portion of the file should not be distributed, a file permission is set to deny a customer access to said file.

Determining that at least a portion of the file should not be distributed may be based on one or more of the file contains malware, said malware comprising disruptive computer instructions that may cause one of the group comprising damage to one or more computing devices, compromising files on one or more computer devices, obtaining private information from the one or more computing devices.

Determining that at least a portion of the file should not be distributed may be based on one or more of the file contains confidential information, the confidential information including one or more of credit card numbers, social security numbers, multiple phone numbers or predefined patterns.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention. The drawings are not necessarily to scale, emphasis instead being placed upon illustrating the principles of the invention.

DETAILED DESCRIPTION

Figure 1:
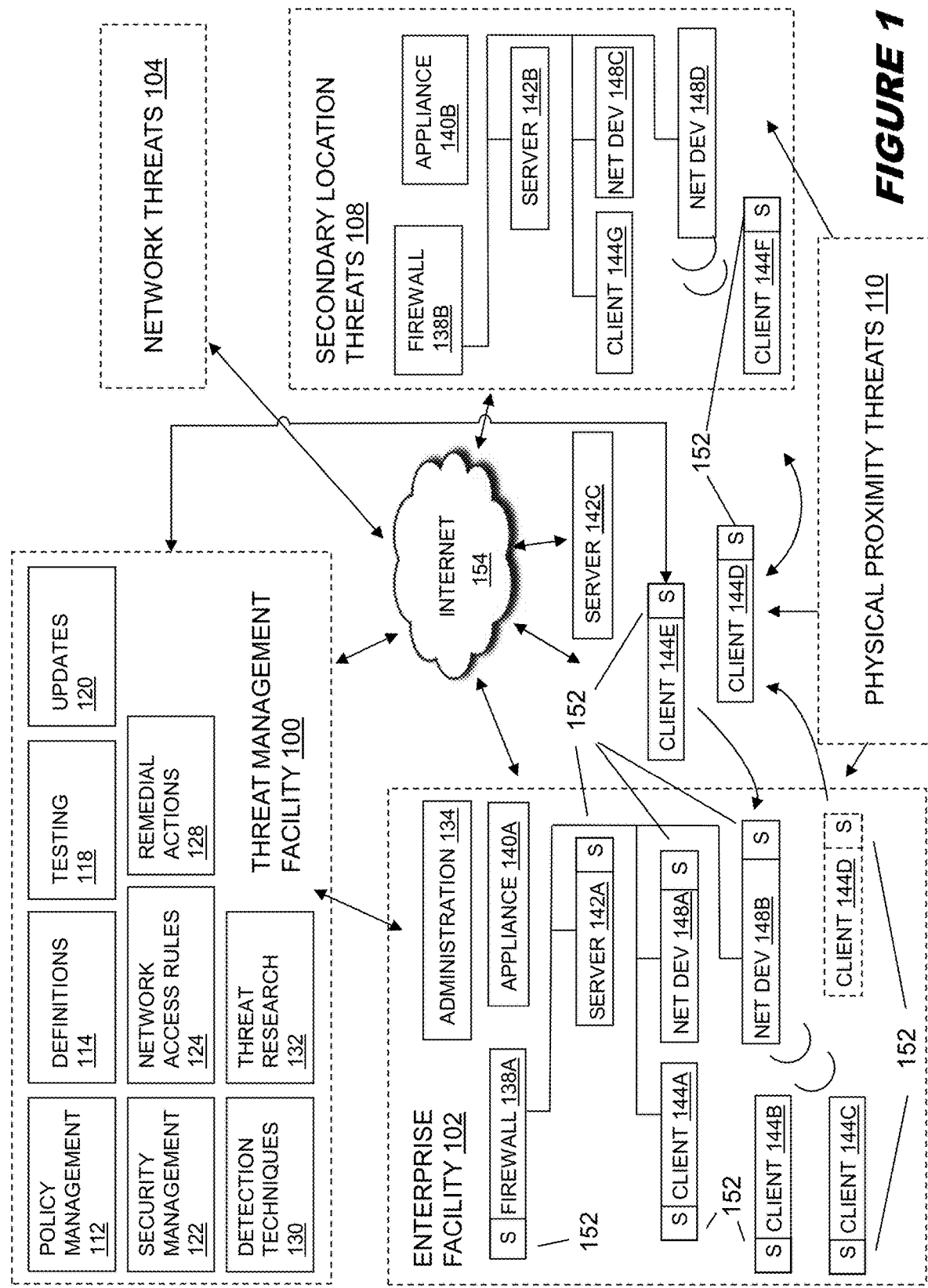
FIG. 1 depicts a diagram of a first particular environment of a threat management system.

The embodiments set forth below represent the necessary information to enable those skilled in the art to practice the invention and illustrate the best mode of practicing embodiments of the invention. Upon reading the following description in light of the accompanying figures, those skilled in the art will understand the concepts of the invention and recognize applications of these concepts not particularly addressed herein. It should be understood that these concepts and applications fall within the scope of the disclosure and the accompanying claims.

References to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

The preferred embodiment of the invention will now be described with reference to the accompanying drawings. The invention may, however, be embodied in many different forms and should not be construed as limited to the embodiment set forth herein; rather, this embodiment is provided so that this disclosure will be thorough and complete, and will fully convey the scope of the invention to those skilled in the art. The terminology used in the detailed description of the particular embodiment illustrated in the accompanying drawings is not intended to be limiting of the invention. In the drawings, like numbers refer to like elements.

FIG. 1 illustrates an environment for threat management. Specifically, FIG. 1 depicts a block diagram of a threat management system providing protection to an enterprise against a plurality of threats. A threat management facility 100 may be used to protect computer assets from many threats, both computer-generated threats and user-generated threats. The threat management facility 100 may be multi-dimensional in that it may be designed to protect corporate assets from a variety of threats and it may be adapted to learn about threats in one dimension (e.g. worm detection) and apply the knowledge in another dimension (e.g. spam detection). Policy management is one of the dimensions for which the threat management facility can provide a control capability. A corporation or other entity may institute a policy that prevents certain people (e.g. employees, groups of employees, types of employees, guest of the corporation, etc.) from accessing certain types of computer programs. For example, the corporation may elect to prevent its accounting department from using a particular version of an instant messaging service or all such services. In this example, the policy management facility 112 may be used to update the policies of all corporate computing assets with a proper policy control facility or it may update a select few. By using the threat management facility 100 to facilitate the setting, updating and control of such policies the corporation only needs to be concerned with keeping the threat management facility 100 up to date on such policies. The threat management facility 100 can take care of updating all of the other corporate computing assets.

Over recent years, malware has become a problem across the Internet 154. From both a technical perspective and a user perspective, the categorization of a specific threat type, whether as virus, worm, spam, phishing exploration, spyware, adware, or the like, is becoming reduced in significance. The threat, no matter how it is categorized, may need to be stopped at various points of a networked computing environment, such as one of an enterprise facility 102, including at one or more laptops, desktops, servers, gateways, communication ports, handheld or mobile devices, firewalls, and the like. Similarly, there may be less and less benefit to the user in having different solutions for known and unknown threats. As such, a consolidated threat management facility 100 may need to apply a similar set of technologies and capabilities for all threats. In certain embodiments, the threat management facility 100 may provide a single agent on the desktop, and a single scan of any suspect file. This approach may eliminate the inevitable overlaps and gaps in protection caused by treating viruses and spyware as separate problems, while simultaneously simplifying administration and minimizing desktop load. As the number and range of types of threats has increased, so may have the level of connectivity available to all IT users. This may have led to a rapid increase in the speed at which threats may move. Today, an unprotected PC connected to the Internet 154 may be infected quickly (perhaps within 10 minutes) which may require acceleration for the delivery of threat protection. Where once monthly updates may have been sufficient, the threat management facility 100 may automatically and seamlessly update its product set against spam and virus threats quickly, for instance, every five minutes, every minute, continuously, or the like. Analysis and testing may be increasingly automated, and also may be performed more frequently; for instance, it may be completed in 15 minutes, and may do so without compromising quality. The threat management facility 100 may also extend techniques that may have been developed for virus and malware protection, and provide them to enterprise facility 102 network administrators to better control their environments. In addition to stopping malicious code, the threat management facility 100 may provide policy management that may be able to control legitimate applications, such as VoIP, instant messaging, peer-to-peer file-sharing, and the like, that may undermine productivity and network performance within the enterprise facility 102.

The threat management facility 100 may provide an enterprise facility 102 protection from computer-based malware, including viruses, spyware, adware, Trojans, intrusion, spam, policy abuse, uncontrolled access, and the like, where the enterprise facility 102 may be any entity with a networked computer-based infrastructure. In an embodiment, FIG. 1 may depict a block diagram of the threat management facility 100 providing protection to an enterprise against a plurality of threats. The enterprise facility 102 may be corporate, commercial, educational, governmental, or the like, and the enterprise facility's 102 computer network may be distributed amongst a plurality of facilities, and in a plurality of geographical locations, and may include administration 134, a firewall 138A, an appliance 140A, server 142A, network devices 148A-B, clients 144A-D, such as protected by computer security facilities 152, and the like. It will be understood that any reference herein to client facilities may include the clients 144A-D shown in FIG. 1 and vice-versa. The threat management facility 100 may include a plurality of functions, such as security management facility 122, policy management facility 112, update facility 120, definitions facility 114, network access rules facility 124, remedial action facility 128, detection techniques facility 130, testing facility 118, threat research facility 132, and the like. In embodiments, the threat protection provided by the threat management facility 100 may extend beyond the network boundaries of the enterprise facility 102 to include clients 144D (or client facilities) that have moved into network connectivity not directly associated or controlled by the enterprise facility 102. Threats to client facilities may come from a plurality of sources, such as from network threats 104, physical proximity threats 110, secondary location threats 108, and the like. Clients 144A-D may be protected from threats even when the client 144A-D is not located in association with the enterprise 102, such as when a client 144E-F moves in and out of the enterprise facility 102, for example when interfacing with an unprotected server 142C through the Internet 154, when a client 144F is moving into a secondary location threat 108 such as interfacing with components 140B, 142B, 148C, 148D that are not protected, and the like. In embodiments, the threat management facility 100 may provide an enterprise facility 102 protection from a plurality of threats to multiplatform computer resources in a plurality of locations and network configurations, with an integrated system approach.

The security management facility 122 may include a plurality of elements that provide protection from malware to enterprise facility 102 computer resources, including endpoint security and control, email security and control, web security and control, reputation-based filtering, control of unauthorized users, control of guest and non-compliant computers, and the like. The security management facility 122 may be a software application that may provide malicious code and malicious application protection to a client facility computing resource. The security management facility 122 may have the ability to scan the client facility files for malicious code, remove or quarantine certain applications and files, prevent certain actions, perform remedial actions and perform other security measures. In embodiments, scanning the client facility may include scanning some or all of the files stored to the client facility on a periodic basis, scanning an application when the application is executed, scanning files as the files are transmitted to or from the client facility, or the like. The scanning of the applications and files may be performed to detect known malicious code or known unwanted applications. In an embodiment, new malicious code and unwanted applications may be continually developed and distributed, and updates to the known code database may be provided on a periodic basis, on a demand basis, on an alert basis, or the like.

The security management facility 122 may provide email security and control, where security management may help to eliminate spam, viruses, spyware and phishing, control of email content, and the like. The security management facility's 122 email security and control may protect against inbound and outbound threats, protect email infrastructure, prevent data leakage, provide spam filtering, and the like. In an embodiment, security management facility 122 may provide for web security and control, where security management may help to detect or block viruses, spyware, malware, unwanted applications, help control web browsing, and the like, which may provide comprehensive web access control enabling safe, productive web browsing. Web security and control may provide Internet use policies, reporting on suspect devices, security and content filtering, active monitoring of network traffic, URI filtering, and the like. In an embodiment, the security management facility 122 may provide for network access control, which may provide control over network connections. Network control may stop unauthorized, guest, or non-compliant systems from accessing networks, and may control network traffic that may not be bypassed from the client level. In addition, network access control may control access to virtual private networks (VPN), where VPNs may be a communications network tunneled through another network, establishing a logical connection acting as a virtual network. In embodiments, a VPN may be treated in the same manner as a physical network.

The security management facility 122 may provide host intrusion prevention through behavioral based protection, which may guard against unknown threats by analyzing behavior before software code executes. Behavioral based protection may monitor code when it runs and intervene if the code is deemed to be suspicious or malicious. Advantages of behavioral based protection over runtime protection may include code being prevented from running. Whereas runtime protection may only interrupt code that has already partly executed, behavioral protection can identify malicious code at the gateway or on the file servers and delete the code before it can reach endpoint computers and the like.

The security management facility 122 may provide reputation filtering, which may target or identify sources of known malware. For instance, reputation filtering may include lists of URIs of known sources of malware or known suspicious IP addresses, or domains, say for spam, that when detected may invoke an action by the threat management facility 100, such as dropping them immediately. By dropping the source before any interaction can initiate, potential threat sources may be thwarted before any exchange of data can be made.

In embodiments, information may be sent from the enterprise back to a third party, a vendor, or the like, which may lead to improved performance of the threat management facility 100. For example, the types, times, and number of virus interactions that a client experiences may provide useful information for the preventions of future virus threats. This type of feedback may be useful for any aspect of threat detection. Feedback of information may also be associated with behaviors of individuals within the enterprise, such as being associated with most common violations of policy, network access, unauthorized application loading, unauthorized external device use, and the like. In embodiments, this type of information feedback may enable the evaluation or profiling of client actions that are violations of policy that may provide a predictive model for the improvement of enterprise policies.

The security management facility 122 may support overall security of the enterprise facility 102 network or set of enterprise facility 102 networks, e.g., by providing updates of malicious code information to the enterprise facility 102 network and associated client facilities. The updates may include a planned update, an update in reaction to a threat notice, an update in reaction to a request for an update, an update based on a search of known malicious code information, or the like. The administration facility 134 may provide control over the security management facility 122 when updates are performed. The updates may be automatically transmitted without an administration facility's 134 direct control, manually transmitted by the administration facility 134, or otherwise distributed. The security management facility 122 may manage the receipt of malicious code descriptions from a provider, distribution of the malicious code descriptions to enterprise facility 102 networks, distribution of the malicious code descriptions to client facilities, and so forth.

The threat management facility 100 may provide a policy management facility 112 that may be able to block non-malicious applications, such as VoIP, instant messaging, peer-to-peer file-sharing, and the like, that may undermine productivity and network performance within the enterprise facility 102. The policy management facility 112 may be a set of rules or policies that may indicate enterprise facility 102 access permissions for the client facility, such as access permissions associated with the network, applications, external computer devices, and the like. The policy management facility 112 may include a database, a text file, a combination of databases and text files, or the like. In an embodiment, a policy database may be a block list, a black list, an allowed list, a white list, or the like that may provide a list of enterprise facility 102 external network locations/applications that may or may not be accessed by the client facility. The policy management facility 112 may include rules that may be interpreted with respect to an enterprise facility 102 network access request to determine if the request should be allowed. The rules may provide a generic rule for the type of access that may be granted. The rules may be related to the policies of an enterprise facility 102 for access rights for the enterprise facility's 102 client facility. For example, there may be a rule that does not permit access to sporting websites. When a website is requested by the client facility, a security facility may access the rules within a policy facility to determine if the requested access is related to a sporting website. In an embodiment, the security facility may analyze the requested website to determine if the website matches with any of the policy facility rules.

The policy management facility 112 may be similar to the security management facility 122 but with the addition of enterprise facility 102 wide access rules and policies that may be distributed to maintain control of client facility access to enterprise facility 102 network resources. The policies may be defined for application type, subset of application capabilities, organization hierarchy, computer facility type, user type, network location, time of day, connection type, or the like. Policies may be maintained by the administration facility 134, through the threat management facility 100, in association with a third party, or the like. For example, a policy may restrict IM activity to only support personnel for communicating with customers. This may allow communication for departments requiring access, but may maintain the network bandwidth for other activities by restricting the use of IM to only the personnel that need access to instant messaging (IM) in support of the enterprise facility 102. In an embodiment, the policy management facility 112 may be a stand-alone application, may be part of the network server facility 142, may be part of the enterprise facility 102 network, may be part of the client facility, or the like.

The threat management facility 100 may provide configuration management, which may be similar to policy management, but may specifically examine the configuration set of applications, operating systems, hardware, and the like, and manage changes to their configurations. Assessment of a configuration may be made against a standard configuration policy, detection of configuration changes, remediation of improper configuration, application of new configurations, and the like. An enterprise may keep a set of standard configuration rules and policies which may represent the desired state of the device. For example, a client firewall may be running and installed, but in the disabled state, where remediation may be to enable the firewall. In another example, the enterprise may set a rule that disallows the use of USB disks, and sends a configuration change to all clients, which turns off USB drive access via a registry.

The threat management facility 100 may also provide for the removal of applications that potentially interfere with the operation of the threat management facility 100, such as competitor products that may also be attempting similar threat management functions. The removal of such products may be initiated automatically whenever such products are detected. In the case where such applications are services are provided indirectly through a third-party product, the application may be suspended until action is taken to remove or disable the third-party product's protection facility.

Threat management against a quickly evolving malware environment may require timely updates, and thus an update management facility 120 may be provided by the threat management facility 100. In addition, a policy management facility 112 may also require update management (e.g., as provided by the update facility 120 herein described). The update management for the security facility 122 and policy management facility 112 may be provided directly by the threat management facility 100, such as by a hosted system or in conjunction with the administration facility 134. In embodiments, the threat management facility 100 may provide for patch management, where a patch may be an update to an operating system, an application, a system tool, or the like, where one of the reasons for the patch is to reduce vulnerability to threats.

The security facility 122 and policy management facility 112 may push information to the enterprise facility 102 network and/or client facility. The enterprise facility 102 network and/or client facility may also or instead pull information from the security facility 122 and policy management facility 112 network server facilities 142, or there may be a combination of pushing and pulling of information between the security facility 122 and the policy management facility 112 network servers 142, enterprise facility 102 network, and client facilities, or the like. For example, the enterprise facility 102 network and/or client facility may pull information from the security facility 122 and policy management facility 112 network server facility 142 may request the information using the security facility 122 and policy management facility 112 update module; the request may be based on a certain time period, by a certain time, by a date, on demand, or the like. In another example, the security facility 122 and policy management facility 112 network servers 142 may push the information to the enterprise facility's 102 network and/or client facility by providing notification that there are updates available for download and then transmitting the information. The combination of the security management 122 network server facility 142 and security update module may function substantially the same as the policy management facility 112 network server and policy update module by providing information to the enterprise facility 102 network and the client facility in a push or pull method. In an embodiment, the policy management facility 112 and the security facility 122 management update modules may work in concert to provide information to the enterprise facility's 102 network and/or client facility for control of application execution. In an embodiment, the policy update module and security update module may be combined into a single update module.

As threats are identified and characterized, the threat management facility 100 may create definition updates that may be used to allow the threat management facility 100 to detect and remediate the latest malicious software, unwanted applications, configuration and policy changes, and the like. The threat definition facility 114 may contain threat identification updates, also referred to as definition files. A definition file may be a virus identity file that may include definitions of known or potential malicious code. The virus identity (IDE) definition files may provide information that may identify malicious code within files, applications, or the like. The definition files may be accessed by security management facility 122 when scanning files or applications within the client facility for the determination of malicious code that may be within the file or application. The definition files may contain a number of commands, definitions, or instructions, to be parsed and acted upon, or the like. In embodiments, the client facility may be updated with new definition files periodically to provide the client facility with the most recent malicious code definitions; the updating may be performed on a set time period, may be updated on demand from the client facility, may be updated on demand from the network, may be updated on a received malicious code alert, or the like. In an embodiment, the client facility may request an update to the definition files from an update facility 120 within the network, may request updated definition files from a computing facility external to the network, updated definition files may be provided to the client facility 114 from within the network, definition files may be provided to the client facility from an external computing facility from an external network, or the like.

A definition management facility 114 may provide timely updates of definition files information to the network, client facilities, and the like. New and altered malicious code and malicious applications may be continually created and distributed to networks worldwide. The definition files that maintain the definitions of the malicious code and malicious application information for the protection of the networks and client facilities may need continual updating to provide continual defense of the network and client facility from the malicious code and malicious applications. The definition files management may provide for automatic and manual methods of updating the definition files. In embodiments, the network may receive definition files and distribute the definition files to the network client facilities, the client facilities may receive the definition files directly, or the network and client facilities may both receive the definition files, or the like. In an embodiment, the definition files may be updated on a fixed periodic basis, on demand by the network and/or the client facility, as a result of an alert of a new malicious code or malicious application, or the like. In an embodiment, the definition files may be released as a supplemental file to an existing definition files to provide for rapid updating of the definition files.

In a similar manner, the security management facility 122 may be used to scan an outgoing file and verify that the outgoing file is permitted to be transmitted per the enterprise facility 102 rules and policies. By checking outgoing files, the security management facility 122 may be able to discover malicious code infected files that were not detected as incoming files as a result of the client facility having been updated with either new definition files or policy management facility 112 information. The definition files may discover the malicious code infected file by having received updates of developing malicious code from the administration facility 134, updates from a definition files provider, or the like. The policy management facility 112 may discover the malicious code infected file by having received new updates from the administration facility 134, from a rules provider, or the like.

The threat management facility 100 may provide controlled access to the enterprise facility 102 networks. For instance, a manager of the enterprise facility 102 may want to restrict access to certain applications, networks, files, printers, servers, databases, or the like. In addition, the manager of the enterprise facility 102 may want to restrict user access based on certain criteria, such as the user's location, usage history, need to know, job position, connection type, time of day, method of authentication, client-system configuration, or the like. Network access rules may be developed for the enterprise facility 102, or pre-packaged by a supplier, and managed by the threat management facility 100 in conjunction with the administration facility 134.

A network access rules facility 124 may be responsible for determining if a client facility application should be granted access to a requested network location. The network location may be on the same network as the facility or may be on another network. In an embodiment, the network access rules facility 124 may verify access rights for client facilities from within the network or may verify access rights of computer facilities from external networks. When network access for a client facility is denied, the network access rules facility 124 may send an information file to the client facility containing. For example, the information sent by the network access rules facility 124 may be a data file. The data file may contain a number of commands, definitions, instructions, or the like to be parsed and acted upon through the remedial action facility 128, or the like. The information sent by the network access facility rules facility 124 may be a command or command file that the remedial action facility 128 may access and take action upon.

The network access rules facility 124 may include databases such as a block list, a black list, an allowed list, a white list, an unacceptable network site database, an acceptable network site database, a network site reputation database, or the like of network access locations that may or may not be accessed by the client facility. Additionally, the network access rules facility 124 may incorporate rule evaluation; the rule evaluation may parse network access requests and apply the parsed information to network access rules. The network access rule facility 124 may have a generic set of rules that may be in support of an enterprise facility's 102 network access policies, such as denying access to certain types of websites, controlling instant messenger accesses, or the like. Rule evaluation may include regular expression rule evaluation, or other rule evaluation method for interpreting the network access request and comparing the interpretation to the established rules for network access. In an embodiment, the network access rules facility 124 may receive a rules evaluation request from the network access control and may return the rules evaluation to the network access control.

Similar to the threat definitions facility 114, the network access rule facility 124 may provide updated rules and policies to the enterprise facility 102. The network access rules facility 124 may be maintained by the network administration facility 134, using network access rules facility 124 management. In an embodiment, the network administration facility 134 may be able to maintain a set of access rules manually by adding rules, changing rules, deleting rules, or the like. Additionally, the administration facility 134 may retrieve predefined rule sets from a remote provider of a set of rules to be applied to an entire enterprise facility 102. The network administration facility 134 may be able to modify the predefined rules as needed for a particular enterprise facility 102 using the network access rules management facility 124.

When a threat or policy violation is detected by the threat management facility 100, the threat management facility 100 may perform or initiate a remedial action facility 128. Remedial action may take a plurality of forms, such as terminating or modifying an ongoing process or interaction, sending a warning to a client or administration facility 134 of an ongoing process or interaction, executing a program or application to remediate against a threat or violation, record interactions for subsequent evaluation, or the like. Remedial action may be associated with an application that responds to information that a client facility network access request has been denied. In an embodiment, when the data file is received, remedial action may parse the data file, interpret the various aspects of the data file, and act on the parsed data file information to determine actions to be taken on an application requesting access to a denied network location. In an embodiment, when the data file is received, remedial action may access the threat definitions to parse the data file and determine an action to be taken on an application requesting access to a denied network location. In an embodiment, the information received from the facility may be a command or a command file. The remedial action facility may carry out any commands that are received or parsed from a data file from the facility without performing any interpretation of the commands. In an embodiment, the remedial action facility may interact with the received information and may perform various actions on a client requesting access to a denied network location. The action may be one or more of continuing to block all requests to a denied network location, a malicious code scan on the application, a malicious code scan on the client facility, quarantine of the application, terminating the application, isolation of the application, isolation of the client facility to a location within the network that restricts network access, blocking a network access port from a client facility, reporting the application to an administration facility 134, or the like.

Remedial action may be provided as a result of a detection of a threat or violation. The detection techniques facility 130 may include monitoring the enterprise facility 102 network or endpoint devices, such as by monitoring streaming data through the gateway, across the network, through routers and hubs, and the like. The detection techniques facility 130 may include monitoring activity and stored files on computing facilities, such as on server facilities 142, desktop computers, laptop computers, other mobile computing devices, and the like. Detection techniques, such as scanning a computer's stored files, may provide the capability of checking files for stored threats, either in the active or passive state. Detection techniques, such as streaming file management, may provide the capability of checking files received at the network, gateway facility, client facility, and the like. This may provide the capability of not allowing a streaming file or portions of the streaming file containing malicious code from entering the client facility, gateway facility, or network. In an embodiment, the streaming file may be broken into blocks of information, and a plurality of virus identities may be used to check each of the blocks of information for malicious code. In an embodiment, any blocks that are not determined to be clear of malicious code may not be delivered to the client facility, gateway facility, or network.

Verifying that the threat management facility 100 is detecting threats and violations to established policy, may require the ability to test the system, either at the system level or for a particular computing component. The testing facility 118 may allow the administration facility 134 to coordinate the testing of the security configurations of client facility computing facilities on a network. The administration facility 134 may be able to send test files to a set of client facility computing facilities to test the ability of the client facility to determine acceptability of the test file. After the test file has been transmitted, a recording facility may record the actions taken by the client facility in reaction to the test file. The recording facility may aggregate the testing information from the client facility and report the testing information to the administration facility 134. The administration facility 134 may be able to determine the level of preparedness of the client facility computing facilities by the reported information. Remedial action may be taken for any of the client facility computing facilities as determined by the administration facility 134; remedial action may be taken by the administration facility 134 or by the user of the client facility.

The threat research facility 132 may provide a continuously ongoing effort to maintain the threat protection capabilities of the threat management facility 100 in light of continuous generation of new or evolved forms of malware. Threat research may include researchers and analysts working on known and emerging malware, such as viruses, rootkits a spyware, as well as other computer threats such as phishing, spam, scams, and the like. In embodiments, through threat research, the threat management facility 100 may be able to provide swift, global responses to the latest threats.

The threat management facility 100 may provide threat protection to the enterprise facility 102, where the enterprise facility 102 may include a plurality of networked components, such as client facility, server facility 142, administration facility 134, firewall 138, gateway, hubs and routers 148, threat management appliance 140, desktop users, mobile users, and the like. In embodiments, it may be the endpoint computer security facility 152, located on a computer's desktop, which may provide threat protection to a user, and associated enterprise facility 102. In embodiments, the term endpoint may refer to a computer system that may source data, receive data, evaluate data, buffer data, or the like (such as a user's desktop computer as an endpoint computer), a firewall as a data evaluation endpoint computer system, a laptop as a mobile endpoint computer, a personal digital assistant or tablet as a hand-held endpoint computer, a mobile phone as an endpoint computer, or the like. In embodiments, endpoint may refer to a source or destination for data, including such components where the destination is characterized by an evaluation point for data, and where the data may be sent to a subsequent destination after evaluation. The endpoint computer security facility 152 may be an application loaded onto the computer platform or computer support component, where the application may accommodate the plurality of computer platforms and/or functional requirements of the component. For instance, a client facility computer may be one of a plurality of computer platforms, such as Windows, Macintosh, Linux, and the like, where the endpoint computer security facility 152 may be adapted to the specific platform, while maintaining a uniform product and product services across platforms. Additionally, components may have different functions to serve within the enterprise facility's 102 networked computer-based infrastructure. For instance, computer support components provided as hubs and routers 148, server facility 142, firewalls 138, and the like, may require unique security application software to protect their portion of the system infrastructure, while providing an element in an integrated threat management system that extends out beyond the threat management facility 100 to incorporate all computer resources under its protection.

The enterprise facility 102 may include a plurality of client facility computing platforms on which the endpoint computer security facility 152 is adapted. A client facility computing platform may be a computer system that is able to access a service on another computer, such as a server facility 142, via a network. This client facility server facility 142 model may apply to a plurality of networked applications, such as a client facility connecting to an enterprise facility 102 application server facility 142, a web browser client facility connecting to a web server facility 142, an e-mail client facility retrieving e-mail from an Internet 154 service provider's mail storage servers 142, and the like. In embodiments, traditional large client facility applications may be switched to websites, which may increase the browser's role as a client facility. Clients 144 may be classified as a function of the extent to which they perform their own processing. For instance, client facilities are sometimes classified as a fat client facility or thin client facility. The fat client facility, also known as a thick client facility or rich client facility, may be a client facility that performs the bulk of data processing operations itself, and does not necessarily rely on the server facility 142. The fat client facility may be most common in the form of a personal computer, where the personal computer may operate independent of any server facility 142. Programming environments for fat clients 144 may include CURT, Delphi, Droplets, Java, win32, X11, and the like. Thin clients 144 may offer minimal processing capabilities, for instance, the thin client facility may primarily provide a graphical user interface provided by an application server facility 142, which may perform the bulk of any required data processing. Programming environments for thin clients 144 may include JavaScript/AJAX, ASP, JSP, Ruby on Rails, Python's Django, PHP, and the like. The client facility may also be a mix of the two, such as processing data locally, but relying on a server facility 142 for data storage. As a result, this hybrid client facility may provide benefits from both the fat client facility type, such as multimedia support and high performance, and the thin client facility type, such as high manageability and flexibility. In embodiments, the threat management facility 100, and associated endpoint computer security facility 152, may provide seamless threat protection to the plurality of clients 144, and client facility types, across the enterprise facility 102.

The enterprise facility 102 may include a plurality of server facilities 142, such as application servers, communications servers, file servers, database servers, proxy servers, mail servers, fax servers, game servers, web servers, and the like. A server facility 142, which may also be referred to as a server facility 142 application, server facility 142 operating system, server facility 142 computer, or the like, may be an application program or operating system that accepts client facility connections in order to service requests from clients 144. The server facility 142 application may run on the same computer as the client facility using it, or the server facility 142 and the client facility may be running on different computers and communicating across the network. Server facility 142 applications may be divided among server facility 142 computers, with the dividing depending upon the workload. For instance, under light load conditions all server facility 142 applications may run on a single computer and under heavy load conditions a single server facility 142 application may run on multiple computers. In embodiments, the threat management facility 100 may provide threat protection to server facilities 142 within the enterprise facility 102 as load conditions and application changes are made.

A server facility 142 may also be an appliance facility 140, where the appliance facility 140 provides specific services onto the network. Though the appliance facility 140 is a server facility 142 computer, that may be loaded with a server facility 142 operating system and server facility 142 application, the enterprise facility 102 user may not need to configure it, as the configuration may have been performed by a third party. In an embodiment, an enterprise facility 102 appliance may be a server facility 142 appliance that has been configured and adapted for use with the threat management facility 100, and located within the facilities of the enterprise facility 102. The enterprise facility's 102 threat management appliance may enable the enterprise facility 102 to administer an on-site local managed threat protection configuration, where the administration facility 134 may access the threat resources through an interface, such as a web portal. In an alternate embodiment, the enterprise facility 102 may be managed remotely from a third party, vendor, or the like, without an appliance facility 140 located within the enterprise facility 102. In this instance, the appliance functionality may be a shared hardware product between pluralities of enterprises 102. In embodiments, the appliance facility 140 may be located at the enterprise facility 102, where the enterprise facility 102 maintains a degree of control. In embodiments, a hosted service may be provided, where the appliance 140 may still be an on-site black box to the enterprise facility 102, physically placed there because of infrastructure requirements, but managed by a third party, vendor, or the like.

Simple server facility 142 appliances may also be utilized across the enterprise facility's 102 network infrastructure, such as switches, routers, wireless routers, hubs and routers, gateways, print servers, net modems, and the like. These simple server facility appliances may not require configuration by the enterprise facility 102, but may require protection from threats via an endpoint computer security facility 152. These appliances may provide interconnection services within the enterprise facility 102 network, and therefore may advance the spread of a threat if not properly protected.

A client facility may be protected from threats from within the enterprise facility 102 network using a personal firewall, which may be a hardware firewall, software firewall, or combination of these, that controls network traffic to and from a client. The personal firewall may permit or deny communications based on a security policy. Personal firewalls may be designed for use by end-users, which may result in protection for only the computer on which it's installed. Personal firewalls may be able to control network traffic by providing prompts each time a connection is attempted and adapting security policy accordingly. Personal firewalls may also provide some level of intrusion detection, which may allow the software to terminate or block connectivity where it suspects an intrusion is being attempted. Other features that may be provided by a personal firewall may include alerts about outgoing connection attempts, control of program access to networks, hiding the client from port scans by not responding to unsolicited network traffic, monitoring of applications that may be listening for incoming connections, monitoring and regulation of incoming and outgoing network traffic, prevention of unwanted network traffic from installed applications, reporting applications that make connection attempts, reporting destination servers with which applications may be attempting communications, and the like. In embodiments, the personal firewall may be provided by the threat management facility 100.

Another important component that may be protected by an endpoint computer security facility 152 is a network firewall facility 138, which may be a hardware or software device that may be configured to permit, deny, or proxy data through a computer network that has different levels of trust in its source of data. For instance, an internal enterprise facility 102 network may have a high level of trust, because the source of all data has been sourced from within the enterprise facility 102. An example of a low level of trust is the Internet 154, because the source of data may be unknown. A zone with an intermediate trust level, situated between the Internet 154 and a trusted internal network, may be referred to as a "perimeter network." Since firewall facilities 138 represent boundaries between threat levels, the endpoint computer security facility 152 associated with the firewall facility 138 may provide resources that may control the flow of threats at this enterprise facility 102 network entry point. Firewall facilities 138, and associated endpoint computer security facility 152, may also be associated with a network node that may be equipped for interfacing between networks that use different protocols. In embodiments, the endpoint computer security facility 152 may provide threat protection in a plurality of network infrastructure locations, such as at the enterprise facility 102 network entry point, i.e. the firewall facility 138 or gateway; at the server facility 142; at distribution points within the network, i.e. the hubs and routers 148; at the desktop of client facility computers; and the like. In embodiments, the most effective location for threat detection may be at the user's computer desktop endpoint computer security facility 152.

The interface between the threat management facility 100 and the enterprise facility 102, and through the appliance facility 140 to embedded endpoint computer security facilities, may include a set of tools that may be the same for all enterprise implementations, but allow each enterprise to implement different controls. In embodiments, these controls may include both automatic actions and managed actions. Automatic actions may include downloads of the endpoint computer security facility 152 to components of the enterprise facility 102, downloads of updates to existing endpoint computer security facilities of the enterprise facility 102, uploaded network interaction requests from enterprise facility 102 components to the threat management facility 100, and the like. In embodiments, automatic interactions between the enterprise facility 102 and the threat management facility 100 may be configured by the threat management facility 100 and an administration facility 134 in the enterprise facility 102. The administration facility 134 may configure policy rules that determine interactions, such as developing rules for accessing applications, as in who is authorized and when applications may be used; establishing rules for ethical behavior and activities; rules governing the use of entertainment software such as games, or personal use software such as IM and VoIP; rules for determining access to enterprise facility 102 computing resources, including authentication, levels of access, risk assessment, and usage history tracking; rules for when an action is not allowed, such as whether an action is completely deigned or just modified in its execution; and the like. The administration facility 134 may also establish license management, which in turn may further determine interactions associated with a licensed application. In embodiments, interactions between the threat management facility 100 and the enterprise facility 102 may provide threat protection to the enterprise facility 102 by managing the flow of network data into and out of the enterprise facility 102 through automatic actions that may be configured by the threat management facility 100 or the administration facility 134.

Client facilities within the enterprise facility 102 may be connected to the enterprise facility 102 network by way of wired network facilities 148A or wireless network facilities 148B. Client facilities connected to the enterprise facility 102 network via a wired facility 148A or wireless facility 148B may receive similar protection, as both connection types are ultimately connected to the same enterprise facility 102 network, with the same endpoint computer security facility 152, and the same threat protected enterprise facility 102 environment. Mobile wireless facility clients 144B-F, because of their ability to connect to any wireless 148B,D network access point, may connect to the Internet 154 outside the enterprise facility 102, and therefore outside the threat-protected environment of the enterprise facility 102. In this instance the mobile client facility (e.g., the clients 144B-F), if not for the presence of the endpoint computer security facility 152 may experience a malware attack or perform actions counter to enterprise facility 102 established policies. In addition, there may be a plurality of ways for the threat management facility 100 to protect the out-of-enterprise facility 102 mobile client facility (e.g., the clients 144D-F) that has an embedded endpoint computer security facility 152, such as by providing URI filtering in personal routers, using a web appliance as a DNS proxy, or the like. Mobile client facilities that are components of the enterprise facility 102 but temporarily outside connectivity with the enterprise facility 102 network may be provided with the same threat protection and policy control as client facilities inside the enterprise facility 102. In addition, mobile the client facilities may receive the same interactions to and from the threat management facility 100 as client facilities inside the enterprise facility 102, where the mobile client facilities may be considered a virtual extension of the enterprise facility 102, receiving all the same services via their embedded endpoint computer security facility 152.

Interactions between the threat management facility 100 and the components of the enterprise facility 102, including mobile client facility extensions of the enterprise facility 102, may ultimately be connected through the Internet 154. Threat management facility 100 downloads and upgrades to the enterprise facility 102 may be passed from the firewalled networks of the threat management facility 100 through to the endpoint computer security facility 152 equipped components of the enterprise facility 102. In turn the endpoint computer security facility 152 components of the enterprise facility 102 may upload policy and access requests back across the Internet 154 and through to the threat management facility 100. The Internet 154 however, is also the path through which threats may be transmitted from their source. These network threats 104 may include threats from a plurality of sources, including without limitation, websites, e-mail, IM, VoIP, application software, and the like. These threats may attempt to attack a mobile enterprise client facility (e.g., the clients 144B-F) equipped with an endpoint computer security facility 152, but in embodiments, as long as the mobile client facility is embedded with an endpoint computer security facility 152, as described above, threats may have no better success than if the mobile client facility were inside the enterprise facility 102.

However, if the mobile client facility were to attempt to connect into an unprotected connection point, such as at a secondary location 108 that is not a part of the enterprise facility 102, the mobile client facility may be required to request network interactions through the threat management facility 100, where contacting the threat management facility 100 may be performed prior to any other network action. In embodiments, the client facility's 144 endpoint computer security facility 152 may manage actions in unprotected network environments such as when the client facility (e.g., client 144F) is in a secondary location 108 or connecting wirelessly to a non-enterprise facility 102 wireless Internet connection, where the endpoint computer security facility 152 may dictate what actions are allowed, blocked, modified, or the like. For instance, if the client facility's 144 endpoint computer security facility 152 is unable to establish a secured connection to the threat management facility 100, the endpoint computer security facility 152 may inform the user of such, and recommend that the connection not be made. In the instance when the user chooses to connect despite the recommendation, the endpoint computer security facility 152 may perform specific actions during or after the unprotected connection is made, including running scans during the connection period, running scans after the connection is terminated, storing interactions for subsequent threat and policy evaluation, contacting the threat management facility 100 upon first instance of a secured connection for further actions and or scanning, restricting access to network and local resources, or the like. In embodiments, the endpoint computer security facility 152 may perform specific actions to remediate possible threat incursions or policy violations during or after the unprotected connection.

The secondary location 108 may have no endpoint computer security facilities 152 as a part of its computer components, such as its firewalls 138B, servers 142B, clients 144G, hubs and routers 148C-D, and the like. As a result, the computer components of the secondary location 108 may be open to threat attacks, and become potential sources of threats, as well as any mobile enterprise facility clients 144B-F that may be connected to the secondary location's 108 network. In this instance, these computer components may now unknowingly spread a threat to other components connected to the network.

Some threats may not come directly from the Internet 154, such as from non-enterprise facility controlled mobile devices that are physically brought into the enterprise facility 102 and connected to the enterprise facility 102 client facilities. The connection may be made from direct connection with the enterprise facility's 102 client facility, such as through a USB port, or in physical proximity with the enterprise facility's 102 client facility such that a wireless facility connection can be established, such as through a Bluetooth connection. These physical proximity threats 110 may be another mobile computing device, a portable memory storage device, a mobile communications device, or the like, such as CDs and DVDs, memory sticks, flash drives, external hard drives, cell phones, PDAs, MP3 players, digital cameras, point-to-point devices, digital picture frames, digital pens, navigation devices, tablets, appliances, and the like. A physical proximity threat 110 may have been previously infiltrated by network threats while connected to an unprotected network connection outside the enterprise facility 102, and when connected to the enterprise facility 102 client facility, pose a threat. Because of their mobile nature, physical proximity threats 110 may infiltrate computing resources in any location, such as being physically brought into the enterprise facility 102 site, connected to an enterprise facility 102 client facility while that client facility is mobile, plugged into an unprotected client facility at a secondary location 108, and the like. A mobile device, once connected to an unprotected computer resource, may become a physical proximity threat 110. In embodiments, the endpoint computer security facility 152 may provide enterprise facility 102 computing resources with threat protection against physical proximity threats 110, for instance, through scanning the device prior to allowing data transfers, through security validation certificates, through establishing a safe zone within the enterprise facility 102 computing resource to transfer data into for evaluation, and the like.

Having provided an overall context for threat detection, the description now turns to a brief discussion of an example of a computer system that may be used for any of the entities and facilities described above.

Figure 2:
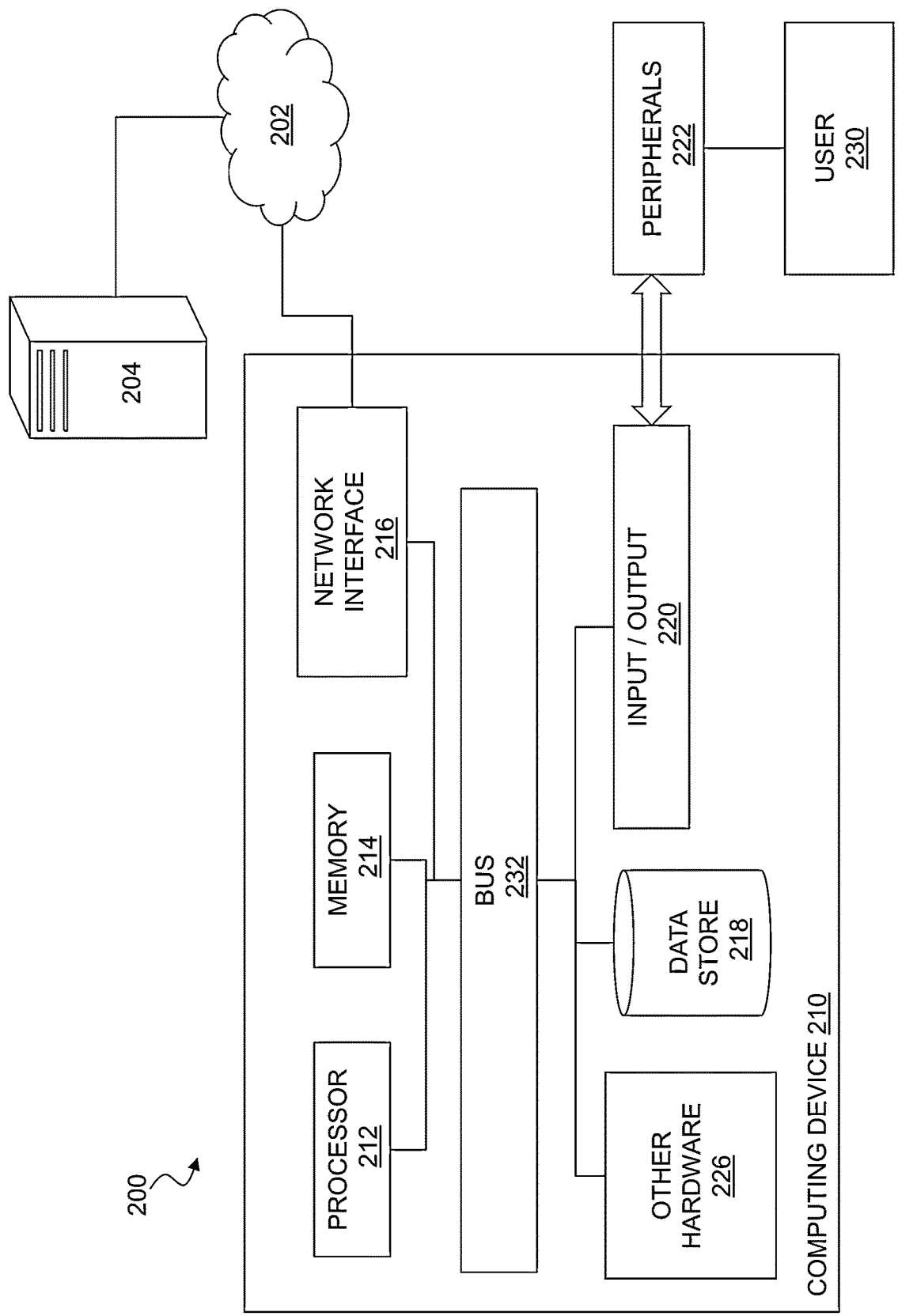
FIG. 2 depicts a block diagram of a computer system.

FIG. 2 illustrates a computer system. In general, the computer system 200 may include a computing device 210 connected to a network 202, e.g., through an external device 204. The computing device 210 may be or include any type of network endpoint or endpoints as described herein, e.g., with reference to FIG. 1 above. For example, the computing device 210 may include a desktop computer workstation. The computing device 210 may also or instead be any suitable device that has processes and communicates over a network 202, including without limitation a laptop computer, a desktop computer, a personal digital assistant, a tablet, a mobile phone, a television, a set top box, a wearable computer (e.g., watch, jewelry, or clothing), a home device (e.g., a thermostat or a home appliance controller), just as some examples. The computing device 210 may also or instead include a server, or it may be disposed on a server.

The computing device 210 may be used for any of the entities described in the threat management environment described above with reference to FIG. 1. For example, the computing device 210 may be a server, a client an enterprise facility, a threat management facility, or any of the other facilities or computing devices described therein. In certain aspects, the computing device 210 may be implemented using hardware or a combination of software and hardware, and the computing device 210 may be a standalone device, a device integrated into another entity or device, a platform distributed across multiple entities, or a virtualized device executing in a virtualization environment.

The network 202 may include any network described above, e.g., data network(s) or internetwork(s) suitable for communicating data and control information among participants in the computer system 200. This may include public networks such as the Internet, private networks, and telecommunications networks such as the Public Switched Telephone Network or cellular networks using third generation cellular technology (e.g., 3G or IMT-2000), fourth generation cellular technology (e.g., 4G, LTE. MT-Advanced, E-UTRA, etc.) or WiMax-Advanced (IEEE 802.16m)) and/or other technologies, as well as any of a variety of corporate area, metropolitan area, campus or other local area networks or enterprise networks, along with any switches, routers, hubs, gateways, and the like that might be used to carry data among participants in the computer system 200. The network 202 may also include a combination of data networks, and need not be limited to a strictly public or private network.

The external device 204 may be any computer or other remote resource that connects to the computing device 210 through the network 202. This may include threat management resources such as any of those contemplated above, gateways or other network devices, remote servers or the like containing content requested by the computing device 210, a network storage device or resource, a device hosting malicious content, or any other resource or device that might connect to the computing device 210 through the network 202.

The computing device 210 may include a processor 212, a memory 214, a network interface 216, a data store 218, and one or more input/output devices 220. The computing device 210 may further include or be in communication with peripherals 222 and other external input/output devices 224.

The processor 212 may be any as described herein, and in general be capable of processing instructions for execution within the computing device 210 or computer system 200. The processor 212 may include a single-threaded processor or a multi-threaded processor. The processor 212 may be capable of processing instructions stored in the memory 214 or on the data store 218.

The memory 214 may store information within the computing device 210 or computer system 200. The memory 214 may include any volatile or non-volatile memory or other computer-readable medium, including without limitation a Random Access Memory (RAM), a flash memory, a Read Only Memory (ROM), a Programmable Read-only Memory (PROM), an Erasable PROM (EPROM), registers, and so forth. The memory 214 may store program instructions, program data, executables, and other software and data useful for controlling operation of the computing device 200 and configuring the computing device 200 to perform functions for a user. The memory 214 may include a number of different stages and types for different aspects of operation of the computing device 210. For example, a processor may include on-board memory and/or cache for faster access to certain data or instructions, and a separate, main memory or the like may be included to expand memory capacity as desired.

The memory 214 may, in general, include a non-volatile computer readable medium containing computer code that, when executed by the computing device 200 creates an execution environment for a computer program in question, e.g., code that constitutes processor firmware, a protocol stack, a database management system, an operating system, or a combination of the foregoing, and that performs some or all of the steps set forth in the various flow charts and other algorithmic descriptions set forth herein. While a single memory 214 is depicted, it will be understood that any number of memories may be usefully incorporated into the computing device 210. For example, a first memory may provide non-volatile storage such as a disk drive for permanent or long-term storage of files and code even when the computing device 210 is powered down. A second memory such as a random access memory may provide volatile (but higher speed) memory for storing instructions and data for executing processes. A third memory may be used to improve performance by providing even higher speed memory physically adjacent to the processor 212 for registers, caching and so forth.

The network interface 216 may include any hardware and/or software for connecting the computing device 210 in a communicating relationship with other resources through the network 202. This may include remote resources accessible through the Internet, as well as local resources available using short range communications protocols using, e.g., physical connections (e.g., Ethernet), radio frequency communications (e.g., WiFi), optical communications, (e.g., fiber optics, infrared, or the like), ultrasonic communications, or any combination of these or other media that might be used to carry data between the computing device 210 and other devices. The network interface 216 may, for example, include a router, a modem, a network card, an infrared transceiver, a radio frequency (RF) transceiver, a near field communications interface, a radio-frequency identification (RFID) tag reader, or any other data reading or writing resource or the like.

More generally, the network interface 216 may include any combination of hardware and software suitable for coupling the components of the computing device 210 to other computing or communications resources. By way of example and not limitation, this may include electronics for a wired or wireless Ethernet connection operating according to the IEEE 802.11 standard (or any variation thereof), or any other short or long range wireless networking components or the like. This may include hardware for short range data communications such as Bluetooth or an infrared transceiver, which may be used to couple to other local devices, or to connect to a local area network or the like that is in turn coupled to a data network 202 such as the Internet. This may also or instead include hardware/software for a WiMax connection or a cellular network connection (using, e.g., CDMA, GSM, LTE, or any other suitable protocol or combination of protocols). The network interface 216 may be included as part of the input/output devices 220 or vice-versa.

The data store 218 may be any internal memory store providing a computer-readable medium such as a disk drive, an optical drive, a magnetic drive, a flash drive, or other device capable of providing mass storage for the computing device 210. The data store 218 may store computer readable instructions, data structures, program modules, and other data for the computing device 210 or computer system 200 in a non-volatile form for subsequent retrieval and use. For example, the data store 218 may store without limitation one or more of the operating system, application programs, program data, databases, files, and other program modules or other software objects and the like.

The input/output interface 220 may support input from and output to other devices that might couple to the computing device 210. This may, for example, include serial ports (e.g., RS-232 ports), universal serial bus (USB) ports, optical ports, Ethernet ports, telephone ports, audio jacks, component audio/video inputs, HDMI ports, and so forth, any of which might be used to form wired connections to other local devices. This may also or instead include an infrared interface, RF interface, magnetic card reader, or other input/output system for coupling in a communicating relationship with other local devices. It will be understood that, while the network interface 216 for network communications is described separately from the input/output interface 220 for local device communications, these two interfaces may be the same, or may share functionality, such as where a USB port is used to attach to a WiFi accessory, or where an Ethernet connection is used to couple to a local network attached storage.

A peripheral 222 may include any device used to provide information to or receive information from the computing device 200. This may include human input/output (I/O) devices such as a keyboard, a mouse, a mouse pad, a track ball, a joystick, a microphone, a foot pedal, a camera, a touch screen, a scanner, or other device that might be employed by the user 230 to provide input to the computing device 210. This may also or instead include a display, a speaker, a printer, a projector, a headset or any other audiovisual device for presenting information to a user. The peripheral 222 may also or instead include a digital signal processing device, an actuator, or other device to support control or communication to other devices or components. Other I/O devices suitable for use as a peripheral 222 include haptic devices, three-dimensional rendering systems, augmented-reality displays, and so forth. In one aspect, the peripheral 222 may serve as the network interface 216, such as with a USB device configured to provide communications via short range (e.g., BlueTooth, WiFi, Infrared, RF, or the like) or long range (e.g., cellular data or WiMax) communications protocols. In another aspect, the peripheral 222 may provide a device to augment operation of the computing device 210, such as a global positioning system (GPS) device, a security dongle, or the like. In another aspect, the peripheral may be a storage device such as a flash card, USB drive, or other solid state device, or an optical drive, a magnetic drive, a disk drive, or other device or combination of devices suitable for bulk storage. More generally, any device or combination of devices suitable for use with the computing device 200 may be used as a peripheral 222 as contemplated herein.

Other hardware 226 may be incorporated into the computing device 200 such as a co-processor, a digital signal processing system, a math co-processor, a graphics engine, a video driver, and so forth. The other hardware 226 may also or instead include expanded input/output ports, extra memory, additional drives (e.g., a DVD drive or other accessory), and so forth.

A bus 232 or combination of busses may serve as an electromechanical platform for interconnecting components of the computing device 200 such as the processor 212, memory 214, network interface 216, other hardware 226, data store 218, and input/output interface. As shown in the figure, each of the components of the computing device 210 may be interconnected using a system bus 232 or other communication mechanism for communicating information.

Methods and systems described herein can be realized using the processor 212 of the computer system 200 to execute one or more sequences of instructions contained in the memory 214 to perform predetermined tasks. In embodiments, the computing device 200 may be deployed as a number of parallel processors synchronized to execute code together for improved performance, or the computing device 200 may be realized in a virtualized environment where software on a hypervisor or other virtualization management facility emulates components of the computing device 200 as appropriate to reproduce some or all of the functions of a hardware instantiation of the computing device 200.

Figure 3:
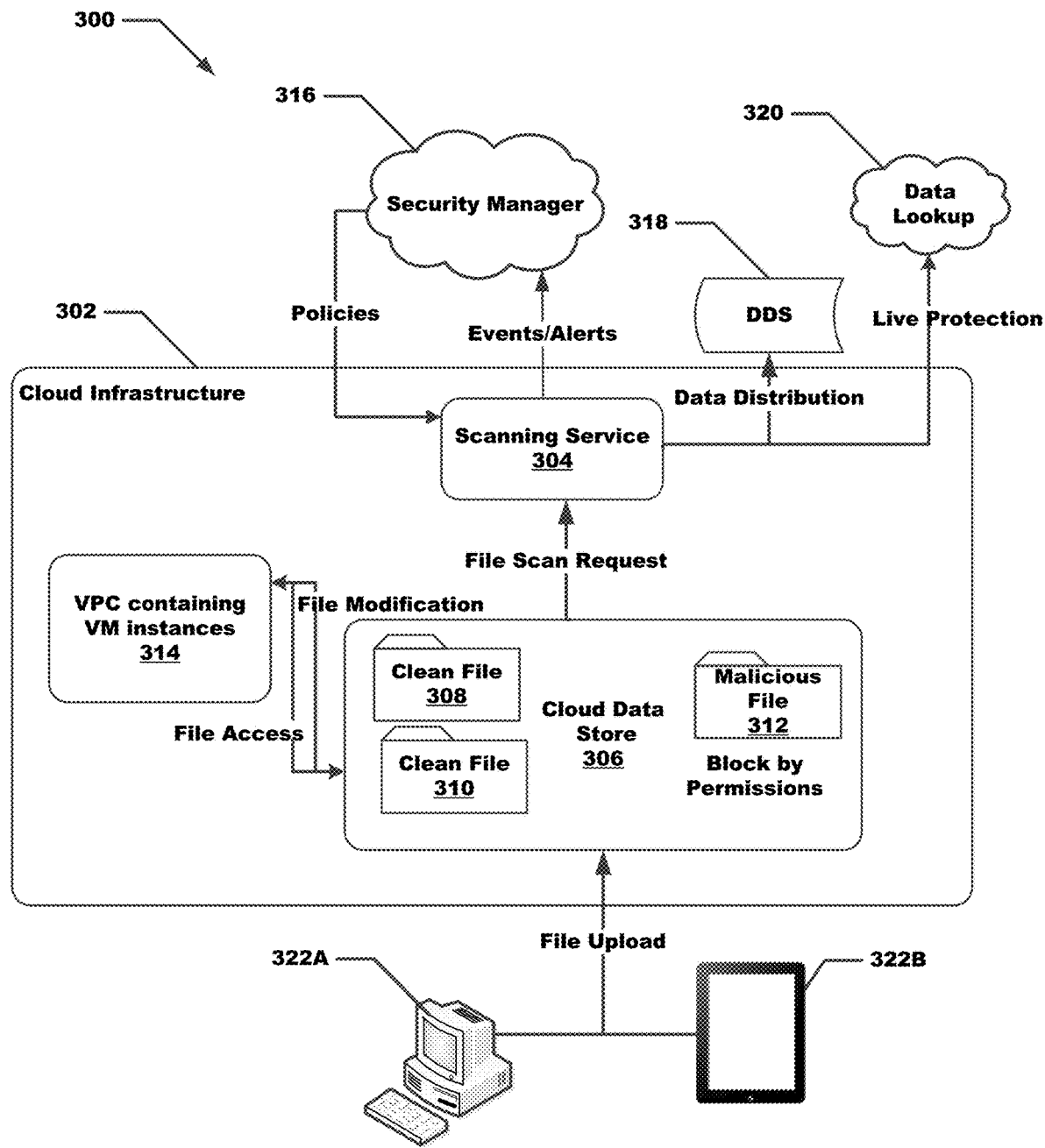
FIG. 3 depicts a block diagram of an implementation.

Referring now to FIG. 3, an example system 300 includes a cloud infrastructure 302 that includes a scanning service 304 and virtual machines running on one or more virtual private clouds 314. Applications instantiated on virtual machines within the virtual private clouds 314 may access one or more cloud data stores 306 for storage of data. Administrators may configure the virtual private clouds in zones, and may architect applications to store in and receive data from the cloud data store 306 so as to provide fault tolerance and availability.

While the cloud infrastructure 302, scanning service 304 and virtual machine instances in the virtual private cloud 314 may be described with respect to cloud-based infrastructure generally, and respect to Amazon Web Services (AWS) and AWS S3 buckets as an example implementation, it should be understood that the architecture and concept may be used with any suitable cloud service and related storage system. For example, cloud infrastructure services available from Microsoft Azure, CenturyLink Cloud, VMware, Rackspace, Joyent, and Google may be suitable in various implementations as well as other cloud infrastructure or infrastructure-as-a-service providers with adjustments or modifications as may be needed for a particular implementation.

Deployment of the scanning service 304 may be accomplished with a workflow that is intended to be relatively simple for an administrator to initiate and manage, and relieve a requirement to deploy and manage an agent on application templates or instances as they are created. This may enable, for example, in some implementations, a usage-based billing model as compared to a per-seat license for each image created, which may be desirable with cloud billing models, and particularly in an auto-scaling environment. As instances are created and shut down, instantiations of the scanning service 304 may be based on the load on the scanning service 304 load, and may be managed, for example, by the security manager 316, rather than the administrator of the applications running in the VPC 314.

In some implementations, installation and registration may involve setting permissions and authentication configuration, so that a cloud scanning provider handles administration of the scanning application and datasets without additional impact to customers' workflows. This reduces complexity for the application administrator when adding data protection capability to applications.

The system 300 includes a cloud infrastructure service 302 that provides computing resources for execution of software applications, data storage, and resource management, and may provide other services as well. In an example implementation, the cloud infrastructure service 302 is implemented with the AWS service, although as mentioned above other suitable cloud infrastructure services may be used.

The cloud infrastructure service 302 may include a cloud data store 306. The cloud data store 306 may be used by applications within the cloud infrastructure service 302 to store data. The cloud data store 306 may be used, for example, by a web application operating within the cloud infrastructure service 302 to store files uploaded to the web application by a user. The cloud data store 306 may receive one or more files directly or indirectly from applications, such as mobile apps, operating on user device 322A or a mobile device 322B. In an AWS implementation, the cloud data store 306 may be implemented with the AWS Simple Storage Service S3. Other cloud data services may be used instead or in addition.

The cloud infrastructure service 302 may include a scanning service 304. The scanning service 304 may be implemented with one or more scanning applications running on one or more virtual machines within the cloud infrastructure 302. The scanning service 304 may receive policies from a security manager 316 and also may provide status information, events, and alerts to the security manager 316.

The security manager 316 may be implemented within the cloud infrastructure service 302 or outside the cloud infrastructure service 302. The security manager 316 may provide a web-based management interface for configuration of the scanning service 304 and for an administrator to manage their use of the scanning service 304 and potentially other security applications. For example, the security manager 316 may provide management for endpoint protection, firewalls, and so forth. In some implementations, one or more firewalls under management by the security manager 316 are included in the virtual private cloud 314 and may be managed by the security manager 316.

The scanning service 304 may receive data updates from a Data Distribution Service (DDS) 318. Data from the DDS 318 may include, for example, code updates and definitions of known or potential malicious files, portions of files, code, or content, or code that may be used to identify malicious files, applications, or the like. The definition files may contain one or more commands, definitions, patterns, or instructions, to be parsed and acted upon, matched, or the like. Patterns may include, for example, identifying files or portions of files that fit a specific pattern, or that were identified in malicious files. Patterns also may include, for example, identifying code that has the same effect of code that is known to be malicious. The data updates may be used by the scanning service 304 when scanning files.

The scanning service 304 may exchange security-related information, such as files or portions of files and resource reputation information with a security data lookup service 320. The security data lookup service 320 may be provided within the cloud infrastructure 302 or outside the cloud infrastructure 302. The security data lookup service 320 may be used, for example, to check patterns identified by the scanning service 304, determine reputations of resources identified or provided by the scanning service 304, and so forth. The scanning service 304 may provide files or data to the data lookup facility 320 for further analysis. In some implementations, the scanning service 304 may initiate sending data to the data lookup 320 under a variety of circumstances, for example, if the scanning service 304 is unable to determine whether a file or a portion of a file is malicious, or the relevance of code or other content, or if the reputation of a file is unknown. The data lookup service 320 may request a file or data to be provided to the data lookup service 320 for further investigation.

The scanning service 304 accesses files to be scanned directly from the cloud data store 306 that is used by the virtual machine instances, which avoids overhead and performance delay. The use of virtual machine instances for the scanning that are different from the virtual machine instances of the application facilitate management and reduce complexity. In some implementations, the scanning service provides alerts to an administrator, but does not attempt to control access to files. In some implementations, the scanning service may move files or change the name of files in order to control access. For example, to prevent access to a file, the scanning service may change the name or the location (e.g., path in a file system) of a file in order to prevent access. In some implementations, the scanning service 304 may replace a file with another file that is "clean."

In some implementations, file permissions are used to control use of files. For example, if the scanning service 304 has been configured with an account having the appropriate permissions, the scanning service 304 may change the permission of files in the cloud data store 306 to permit or deny access to files by the applications in the virtual private cloud 314. Use of file permissions to control file access provides security for data, without a need for lengthy setup or installation. This reduces the costs to deploy and provision and takes advantage of the benefits of the cloud, which is to distribute processing and avoid the need for custom infrastructure, which in turn reduces total cost of ownership for cloud applications.

In some implementations in which permissions are used, an application stores a file in the cloud data store 306 with default permissions that permit access by applications running in the VPC 314. The scanning service 304 receives notification of the storage event from the cloud data store 306, and the scanning service 304 scans the file. If access to the file needs to be restricted based on the scan, the scanning service 304 changes the permission of the file so that applications in the VPC 314 can no longer access the file.

In some implementations in which permissions are used, an application stores a file in the cloud data store 306 with default permissions that do not permit access by applications running in the VPC 314. The scanning service 304 receives notification of the storage event from the cloud data store 306, and the scanning service 304 scans the file. If access to the file needs to be restricted based on the scan, the scanning service 304 does not change the permission of the file so that applications in the VPC 314 still cannot access the file. If access to the file does not need to be restricted based on the scan, the scanning service 304 changes the permission of the file so that applications in the VPC 314 may access the file.

The cloud infrastructure 302 may include a virtual private cloud (VPC) 314 including one or more computing resources on which virtual machine instances are implemented. For example, the virtual private cloud 314 may include one or more applications such as a software application, a web application, a virtual desktop, a server application, etc. Applications in the virtual private cloud 314 may access and store data in the cloud data store 306, depending on the permissions assigned to the files in the cloud data store 306. In some implementations, some or all of applications may be implemented on infrastructure inside or outside of the cloud. For example, applications may be implemented in a co-location facility or in a data center not associated with a cloud infrastructure. For example, applications may be implemented on a user device, such as a mobile app or desktop computer application. Applications implemented outside of the cloud may make use of cloud resources, such as cloud storage. Use of the scanning techniques described with respect to cloud storage may be useful even if the applications are partially or entirely implemented outside of the cloud infrastructure, for example, with the exception of the cloud storage.

User devices 322A and/or 322B may be in communication with the data store. The user devices 322A, 322B may have applications that directly store data in the data store 306. The user devices 322A, 322B may be in communication with one or more applications in the VPC 314, which in turn store data in the data store 306.

An example is presented in which the cloud data store 306 includes three files 308, 310, 312. The files 308, 310, 312 may be any sort of data file or collection of data files (e.g., a word processing file, an image, a video, an archive collection of files, etc.). In this example, there may be a first clean file 308 and a second clean file 310. The clean files 308, 310 may be clean in the sense that they do not contain content that would be identified by the scanning service 304 to require reporting or restriction. The cloud data store 306 also includes a third file 312, which contains content may be identified by the scanning service 304 to require restriction of file access. For example, the file 312 may include malware or other malicious content. For example, the file may include content that should be protected from distribution under a policy.

In some implementations, access to the malicious file 312 by applications running on the VPC 314 may be prevented through the use of permissions associated with the file 312 within the data store 306, while the clean files 308, 310 may have other permissions assigned and so applications running the on the VPC 314 would not be blocked. As a result, applications running on the VPC may access the clean files 308, 310 but not access the malicious file 312. In some implementations, the file names of the clean files 308, 310 are not changed, but the file name of the malicious file 312 is changed such that applications running on the VPC 314 cannot access the file 312. In some implementations, the clean files 308, 310 are not moved, but the malicious file 312 is moved such that applications running on the VPC 314 cannot access the file 312.

Flow charts of particular embodiments of the presently disclosed methods are depicted in FIGS. 4A and 4B and 5A and 5B. The rectangular elements are herein denoted "processing blocks" and represent computer software instructions or groups of instructions. The diamond shaped elements, are herein denoted "decision blocks," represent computer software instructions, or groups of instructions which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language or hardware implementation. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Figure 4A:
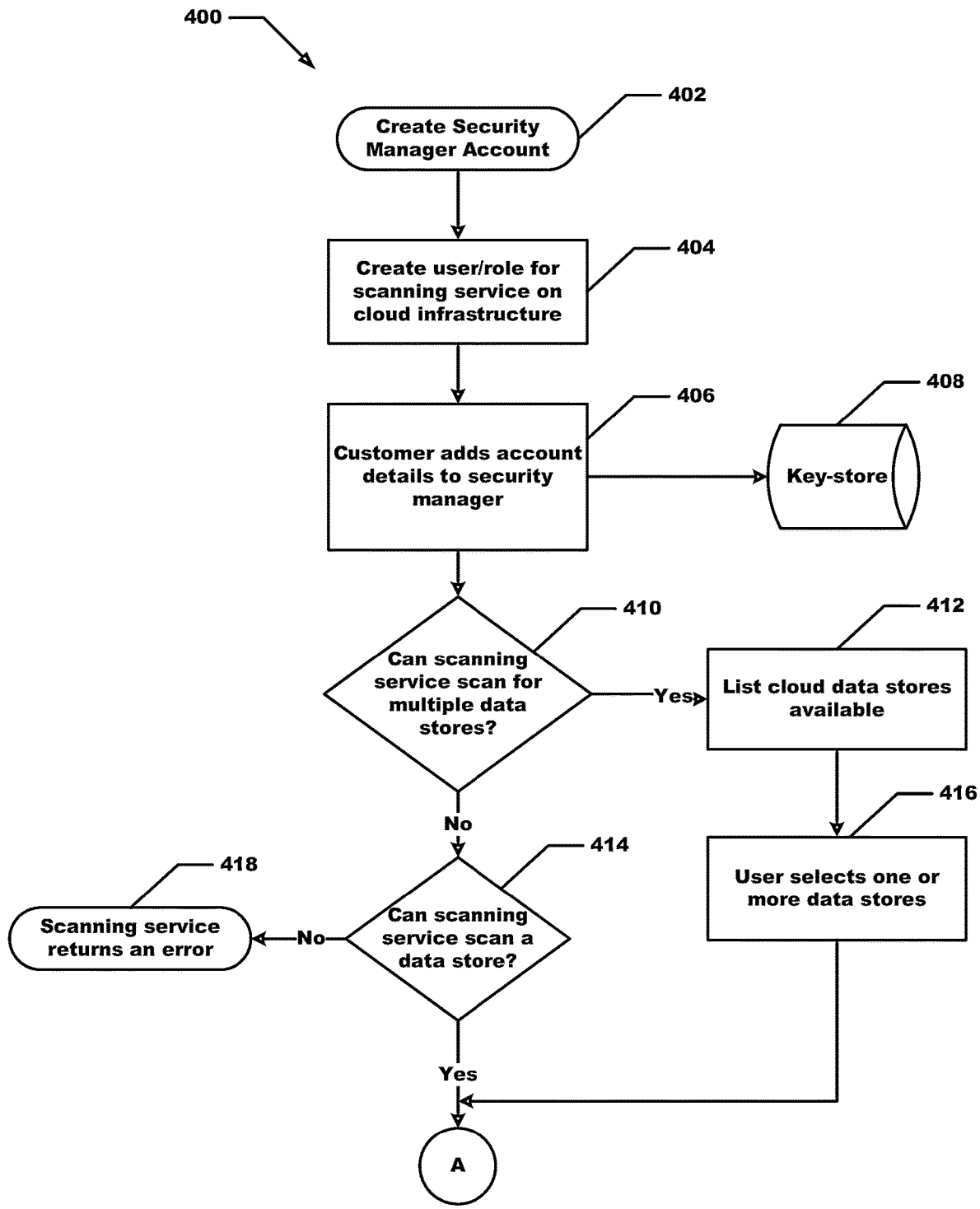
FIGS. 4A and 4B are a flow diagram of an embodiment of a registration process for an agentless scanner.
Figure 4B:
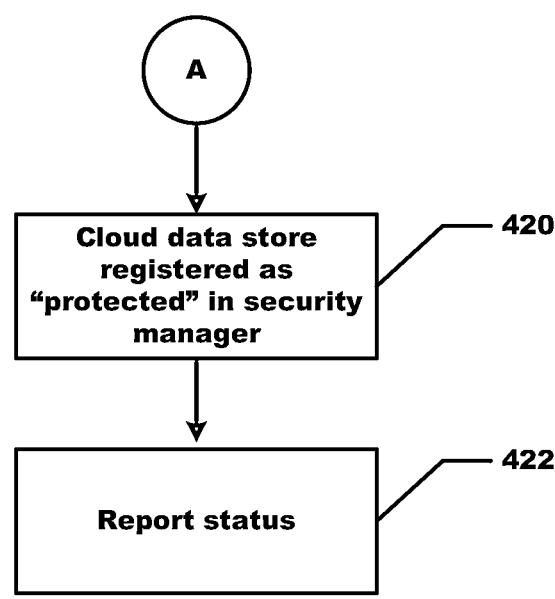

Referring now to FIGS. 4A and 4B, in processing block 402, a user may create or already have a security manager account to manage security services, including, for example, the scanning service.

In processing block 404, the user may create a user/role in the cloud infrastructure for the scanning service. The user/role may be used to access data in the cloud data store, and may be used to access files for scanning and to effect changes, such as to change permissions, move files, change file names, etc. in order to control access.

For example, in AWS, an Identity Access Management (IAM) role may be created for a user. An IAM administrator may, for example, set policies and rights on resources provided by AWS, and provide users with user accounts, password credentials and AWS API credentials. Users and groups may be assigned, with privileges granted to individuals or groups of users. Each role may have a collection of associated policies that apply to a user when that user "assumes" the role. For permissions to be used for access control, the scanning service needs permissions to enable it to access files and change the permissions of files.

In processing block 406, a user may provide the security manager with cloud infrastructure account details for use by the scanning service. The account details may include a role ID, key/password or other authentication information, and account details. This will allow the scanning service to access the cloud data store.

In processing block 408, the scanning service account information may be stored in a secure key store for use by the scanning service. The secure key store may prevent other processes from accessing the account information.

In decision block 410, the security manger determines whether the scanning service can scan for multiple data stores (e.g., multiple S3 buckets). For example, the scanning service may be associated with multiple data stores, cloud infrastructure zones, applications, etc. For example, these may be configured or selected using the security manager.

As shown in processing block 412, when the security manager may list the available data stores for configuration and selection.

At processing block 416, a user may select one or more cloud data stores. Once a cloud data store is selected, the security manager will determine the access rights available to the scanning service in the cloud infrastructure. If the scanning service can access files but not change permissions, the scanning service will operate in a Notification Only protection mode, meaning that it will alert an administrator (as configured) through a web page, email, text message, messaging service, etc. If the scanning service has the permissions to change permissions or perform other file changes, the scanning service may operate in a Block File protection mode.

Decision block 414 determines if the security manager can access at least one cloud data store. If the security manager cannot scan at least one cloud data store, as shown in processing block 418, the security manager will communicate an error.

As shown in processing block 420, if the security manager can scan a single data store, the security manager will enable protection.

In processing block 422, the security manager will report the status of the cloud data stores protected, and the mode of protection that has been configured.

When set up is complete, the security manager may send data to the scanning service, which registers with the cloud data store to start receiving notifications for file events (e.g., uploads, downloads, changes). In some implementations, the security manager will present a user with an interface to set up data protection rules to use check against files in the data store. A user may be able to select predetermined rules, or to generate their own rules.

In some implementations, the scanning service takes file event notifications from the data store as an input. For example, in some implementations, an 'event' may be a JSON file, which is passed into the queue. The scanning service may pull this JSON structure from the queue. The JSON structure may include relevant details about the file activity, and (assuming permissions have been delegated appropriately by the owner of the data store) includes information to access the file. An example JSON structure in the context of AWS is below.

```
{
  "Records":[
    {
      "eventVersion":"2.0",
      "eventSource":"aws:s3",
      "awsRegion":"us-east-1",
      "eventTime":The time, in ISO-8601 format, for example, 1970-01-01T00:00:00.000Z, when S3 finished processing the request,
      "eventName":"event-type",
      "userIdentity":{
        "principalId":"Amazon-customer-ID-of-the-user-who-caused-the-event"
      },
      "requestParameters":{
        "sourceIPAddress":"ip-address-where-request-came-from"
      },
      "responseElements":{
        "x-amz-request-id":"Amazon S3 generated request ID",
        "x-amz-id-2":"Amazon S3 host that processed the request"
      },
      "s3":{
        "s3SchemaVersion":"1.0",
        "configurationId":"ID found in the bucket notification configuration",
        "bucket":{
          "name":"bucket-name",
          "ownerIdentity":{
            "principalId":"Amazon-customer-ID-of-the-bucket-owner"
          },
          "arn":"bucket-ARN"
        },
        "object":{
          "key":"object-key",
          "size":object-size,
          "eTag":"object eTag",
          "versionId":"object version if bucket is versioning-enabled, otherwise null",
```

-continued

```
        "sequencer": "a string representation of a hexadecimal
value used to determine event sequence,
                only used with PUTs and DELETEs"
            }
        }
    },
    {
        // Additional events
    }
    ]
}
```

Based on a notification of a file event, such as a notification of an upload, download, or change to a file, the scanning service may request a copy of the file to be examined. Once the file is copied to the data store of the scanning service (along with meta-data to identify the customers' cloud account and cloud data store) the file may be added to the scan queue and process all required rules as part of the scan of the file. The scanning service may return a scan result (e.g., alert to a security manager) if triggering content is detected. This may be delivered to an administrator as configured in the security manager.

The scanning service may take action to make the file accessible or not accessible based on the scan result. For example, if the default is for files to be stored such that an application cannot access the files, the permissions may be modified to allow access if the file is clean. If the file is malicious, no permissions may need to be modified. In some implementations, file permissions on a flagged file in the cloud data store will be changed so that only an administrator account may access the file. An administrator can then authorize the file, allow download access, or delete the file from the data store.

For example, if the default is for files to be stored such that an application can access the files, the permissions may be modified to allow access if the file is determined to be malicious. If the file is clean, no permissions may need to be modified.

In some implementations, the scanning services uses one or more scanners (e.g., anti-malware, anti-virus, data loss prevention, content matching, etc.) to scan the file and return a result. If the file is determined to contain targeted content the scanning service may alert the security manager using the associated meta-data.

Figure 5A:
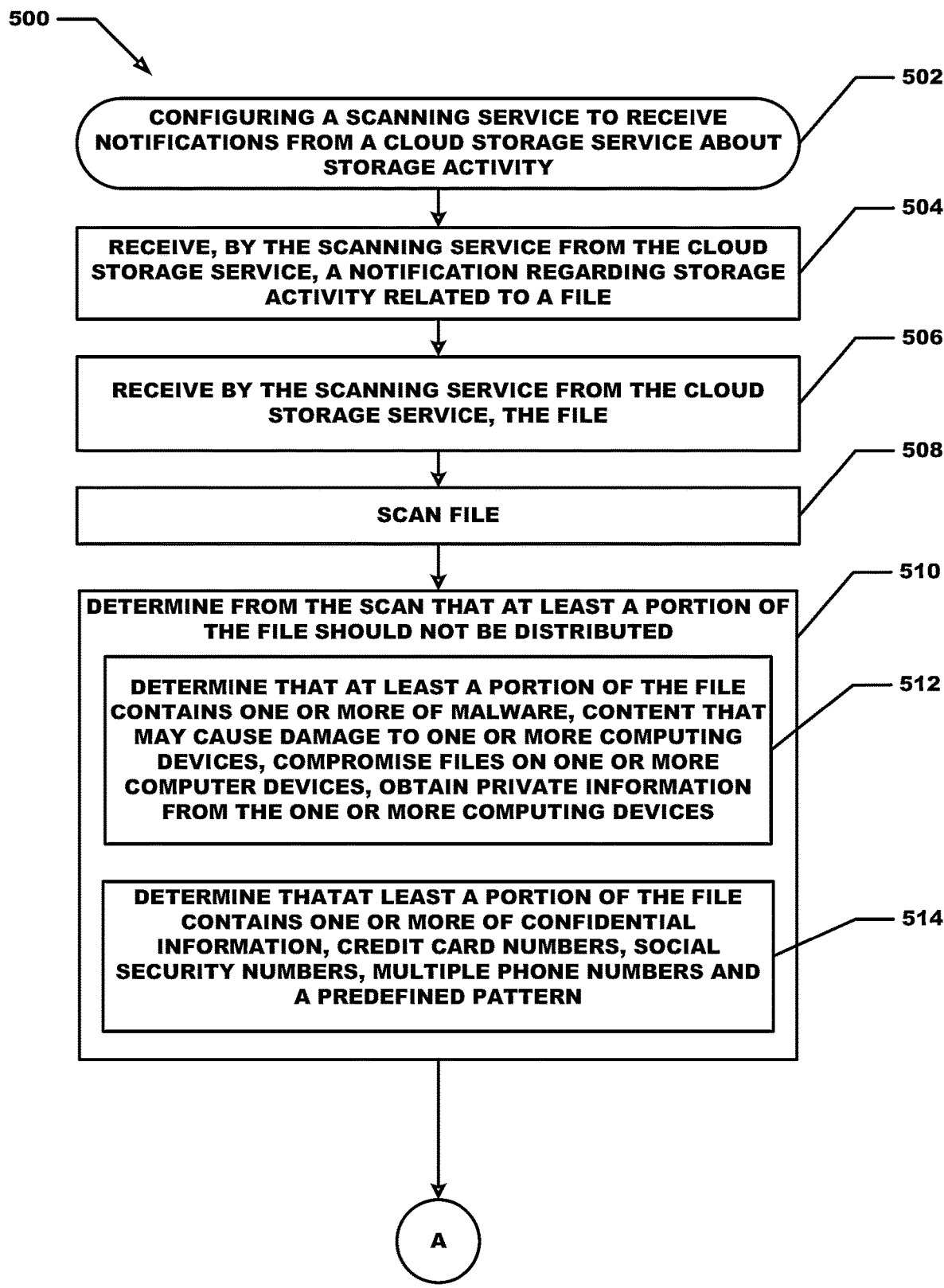
FIGS. 5A and 5B are a flow diagram of for an agentless scanner in accordance with an embodiment.
Figure 5B:
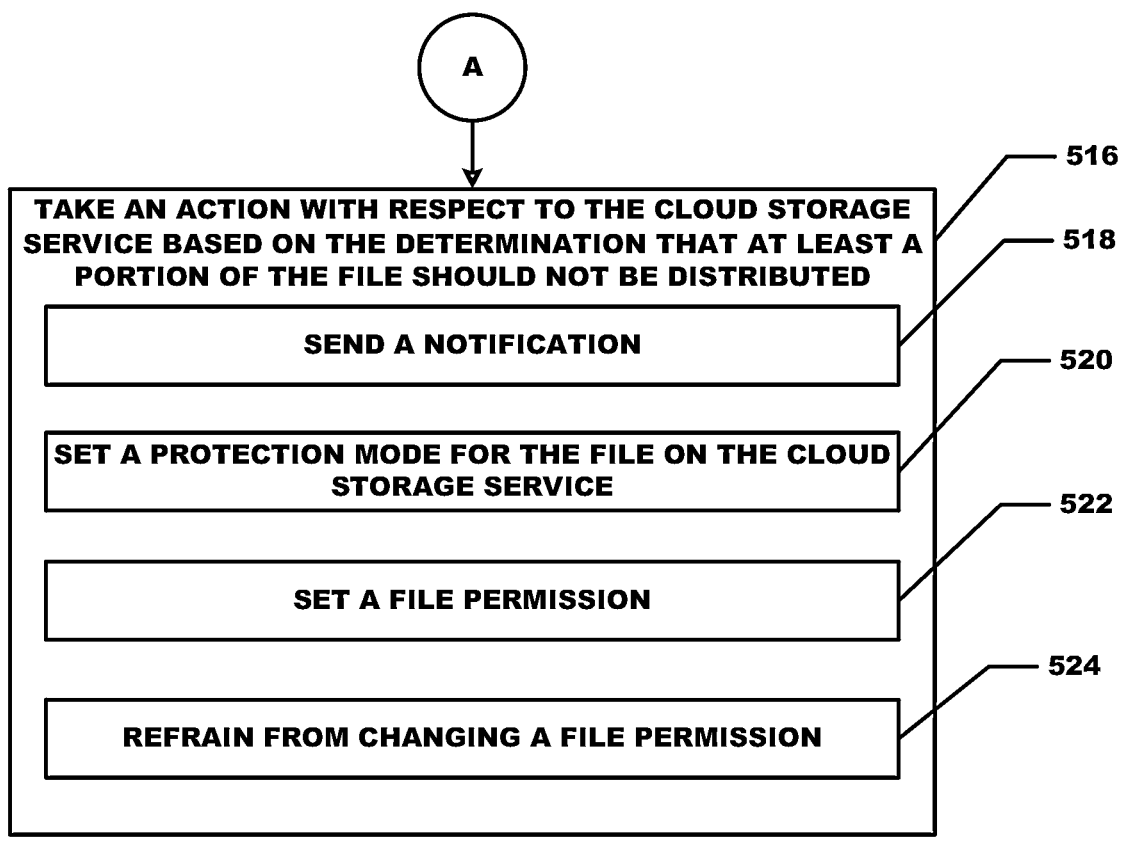

Referring to FIGS. 5A and 5B, a method 500 according to an embodiment begins with processing block 502 in which a scanning service is configured to receive notifications from a cloud storage service about storage activity. In some implementations, the scanning service is configured to receive notifications associated with a plurality of cloud data stores. For example, in an AWS implementation, there may be multiple S3 buckets. In some implementations, the scanning service is configured to receive notifications from the cloud storage service about storage activity associated with a plurality of accounts associated with the cloud storage service. In some implementations, the same scanning service may be configured to receive notifications associated with data stores associated with different users such that different customers of the scanning service may use the same scanning service.

In processing block 504, the scanning service receives from the cloud storage service, a notification regarding storage activity related to a file. The activity may be, as a few examples, a related to an upload of a file to a cloud data store, or related to download of a file from a cloud data store, or related to a change to a file in a cloud data store. The notification may be in the form of an event. The notification may be included in a queue that is monitored by the scanning service. The notification may be provided in the cloud data store, for example, as a file in the cloud data store. The notification may be communicated using an applications programming interface (API) of the cloud infrastructure service or the cloud data store.

In processing block 506, after the completion of the storage activity, the scanning service receives the file from the cloud storage service. The scanning service may copy the file from the cloud data store to another data store. The another data store may be a cloud data store. The another data store may be a local data store.

In processing block 508, the file is scanned by the scanning service. The scan may be performed for determining the existence of compromised content within the file and/or for determining the existence of information within the file that should not be distributed, whether by file upload or download, or otherwise. The scan may be performed using definitions and rules that have been provided by an administrator.

In processing block 510, it is determined from the scan that at least a portion of the file should not be distributed. This may include preventing access by one or more applications.

As shown in processing block 512, the determination that at least a portion of the file should not be distributed may be based on a determination that the file contains one or more of malware or other targeted content, such as disruptive computer instructions, content that may compromise files on one or more computer devices, or obtain private information from one or more computing devices.

As shown in processing block 514, the determination that at least a portion of the file should not be distributed may be based on the file containing confidential information. Such confidential information may include one or more of credit card numbers, social security numbers, one or more telephone numbers, other information, or a predefined pattern. All of these and others could be targeted (e.g., chosen to block) by the customer to prevent them coming into or transiting their cloud data store.

The determination that at least a portion of the file should not be distributed may be based on the file including (without limitation) one or more exploits, content that may compromise customer's infrastructure, Potentially Unwanted Applications (PUAs), a blocked upload of games or other content, executable files, source code, true file type (e.g. block all zip files), movies, in-depth file scanning: customer defines pattern to match in file (e.g. search strings or patterns), personally-identifiable information, zip codes, addresses, outlook mailboxes, spreadsheet containing currency data, customer/contact lists, and date strings.

In processing block 516, an action may be taken with respect to the cloud storage service based on the determination that at least a portion of the file should not be distributed.

In processing block 518, a notification may be sent regarding the file. The notification may include or trigger instructions to take an action. The notification may include information about the file. The notification may include a link to the file. The notification may include a link to delete the file.

In processing block 520, a protection mode for the file on the cloud storage service may be set.

In processing block 522 a permission of the file may be changed to deny access to a file.

As shown in processing block 524, if the permission of the file are already set to prevent file access by an application, the scanning service may refrain from setting a file permission, so that the file will remain unavailable to the application.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used.

What is claimed is:

1. A computer program product comprising instructions stored in memory that configure one or more computing devices to perform a method comprising:
    configuring a scanning service as one or more scanning applications executing on one or more virtual machines external to a cloud storage service, wherein the cloud storage service uses permissions that default to permitting access to files stored on the cloud storage service by applications running in a virtual private cloud that hosts the cloud storage service;
    configuring the scanning service to receive notifications from the cloud storage service about storage activity;
    configuring the scanning service with an account provided by the cloud storage service and associated with the scanning service, the account having privileges to change file permissions that control use, by one or more applications, of the files stored on the cloud storage service;
    receiving, by the scanning service from the cloud storage service, a notification regarding storage activity related to a file;
    after completion of the storage activity, retrieving the file from the cloud storage service with the scanning service;
    scanning the file for malware;
    determining based on the scanning that at least one portion of the file should not be distributed to the one or more applications because the at least one portion of the file contains malware; and
    in response to determining, by the scanning service configured with the account provided by the cloud storage service that has privileges to change file permissions on the files and configured to receive the notifications about the storage activity on the cloud storage service, that the at least one portion of the file should not be distributed, accessing the file on the cloud storage service with the account and setting a file permission for the file on the cloud storage service to make the file unavailable to the one or more applications.

2. The computer program product of claim 1, wherein the instructions further configure the scanning service to receive notifications from the cloud storage service about storage activity associated with a plurality of accounts associated with the cloud storage service.

3. The computer program product of claim 1, wherein the instructions further configure the one or more computing devices to take an action by setting a protection mode for the file on the cloud storage service.

4. The computer program product of claim 3, wherein the protection mode is a Notify Only mode wherein, based on the determination that at least one portion of the file should not be distributed, a notification is sent a to a customer associated with the file.

5. The computer program product of claim 3, wherein the protection mode is a Block File mode wherein, based on the determination that at least a portion of the file should not be distributed, a file permission is set to deny a customer access to the file.

6. The computer program product of claim 1, wherein the determination that at least one portion of the file should not be distributed is based on the malware comprising disruptive instructions that perform one or more of: causing damage to the one or more computing devices, compromising files on the one or more computer devices, and obtaining private information from the one or more computing devices.

7. A method comprising:
    configuring a scanning service as one or more scanning applications executing on one or more virtual machines external to a cloud storage service, wherein the cloud storage service uses permissions that default to permitting access by applications running in a virtual private cloud that hosts the cloud storage service;
    configuring the scanning service to receive notifications from the cloud storage service about storage activity;
    receiving, by the scanning service from the cloud storage service, a notification regarding storage activity related to a file;
    after completion of the storage activity, retrieving the file from the cloud storage service with the scanning service;
    scanning the file for malware;
    determining based on the scanning that at least one portion of the file should not be distributed to one or more applications because the at least one portion of the file contains malware; and
    in response to determining, by the scanning service configured with an account provided by the cloud storage service that has privileges to change file permissions that control use, by the one or more applications, of the files and configured to receive the notifications about the storage activity on the cloud storage service, that the at least one portion of the file should not be distributed, accessing the file on the cloud storage service with the account and setting a file permission for the file on the cloud storage service to make the file unavailable to the one or more applications.

8. The method of claim 7, further comprising configuring the scanning service to receive notifications from the cloud storage service about storage activity associated with a plurality of accounts associated with the cloud storage service.

9. The method of claim 7, further comprising setting a protection mode for the file on the cloud storage service.

10. The method of claim 9, further comprising, when the protection mode is a Notify Only mode and based on the determination that at least one portion of the file should not be distributed, sending notification to a customer associated with the file.

11. The method of claim 9, further comprising, when the protection mode is a Block File mode and based on the determination that at least a portion of the file should not be distributed, setting a file permission to deny a customer access to the file.

12. The method of claim 7, the malware contained within the at least one portion of the file includes disruptive computer instructions that perform one or more of the following: cause damage to one or more computing devices; compromise files on one or more computer devices; and obtain private information from one or more computing devices.

13. The method of claim 7, wherein the file contains confidential information including one or more of a credit card number, a social security number, a phone number, and a predefined pattern.

14. A system comprising:
a processor of a scanning service; and
a non-transitory computer readable storage medium having computer readable code thereon, the medium including instructions executable by the processor to cause the scanning service to:
configure one or more scanning applications of the scanning service, wherein the scanning service is external to a cloud storage service, and where the cloud storage service uses permissions that default to permitting access by applications running in a virtual private cloud hosting the cloud storage service;
receive a notification regarding storage activity related to a file in a cloud storage service;
after completion of the storage activity, retrieve a local copy of the file from the cloud storage service;
scan the local copy of the file for malware;
determine from the scan of the local copy of the file that at least one portion of the local copy of the file contains malicious content; and
in response to determining, by the scanning service configured with an account provided by the cloud storage service that has privileges to change file permissions on the files and configured to receive the notifications about the storage activity on the cloud storage service, that the local copy of the file contains malicious content, access the file in the cloud storage service with the account and setting a file permission for the file on the cloud storage service to make the file unavailable to one or more applications.

15. The system of claim 14, wherein the instructions are further executable by the processor to configure the scanning service to receive notifications from the cloud storage service about storage activity associated with a plurality of accounts associated with the cloud storage service.

16. The system of claim 14, wherein the instructions are further executable by the processor to take an action by setting a protection mode for the file on the cloud storage service.

17. The system of claim 16, wherein the protection mode is a Notify Only mode, and wherein, based on the determination that at least one portion of the file should not be distributed, the instructions are further executable by the processor to send a notification to a customer associated with the file.

18. The system of claim 16, wherein the protection mode is a Block File mode, and wherein, based on the determination that at least one portion of the file should not be distributed, the instructions are further executable by the processor to set a file permission to deny a customer access to the file.

19. The system of claim 14, wherein the malicious content includes malware comprising computer instructions that cause one or more of: damage to one or more computing devices, compromising of files on one or more computer devices, obtaining of private information from one or more computing devices.

20. The system of claim 14, wherein the file contains confidential information including one or more of a credit card number, a social security number, a phone number, and a predefined pattern.

* * * * *